United States Patent
Sakuramoto

(10) Patent No.: US 9,223,947 B2
(45) Date of Patent: Dec. 29, 2015

(54) AUTHENTICATION APPARATUS AND COMPUTER-READABLE MEDIUM STORING AUTHENTICATION PROGRAM CODE

(75) Inventor: Kentaro Sakuramoto, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 911 days.

(21) Appl. No.: 12/860,134

(22) Filed: Aug. 20, 2010

(65) Prior Publication Data

US 2011/0055905 A1 Mar. 3, 2011

(30) Foreign Application Priority Data

Aug. 31, 2009 (JP) ................................. 2009-200759
Aug. 31, 2009 (JP) ................................. 2009-200760

(51) Int. Cl.
*G06F 15/16* (2006.01)
*G06F 21/31* (2013.01)
*G06F 7/02* (2006.01)
*H04L 9/08* (2006.01)

(52) U.S. Cl.
CPC *G06F 21/31* (2013.01); *G06F 7/02* (2013.01); *H04L 9/088* (2013.01)

(58) Field of Classification Search
CPC ............ H04L 9/088; G06F 7/02; G06F 21/31
See application file for complete search history.

(56) References Cited

U.S. PATENT DOCUMENTS

| | | | |
|---|---|---|---|
| 7,264,411 B2* | 9/2007 | Matsunaga et al. | 400/62 |
| 7,369,677 B2* | 5/2008 | Petrovic et al. | 382/100 |
| 7,742,996 B1* | 6/2010 | Kwan | 705/72 |
| 8,145,912 B2* | 3/2012 | McLean | 713/182 |
| 2002/0112183 A1* | 8/2002 | Baird et al. | 713/201 |
| 2004/0064790 A1* | 4/2004 | Aoki et al. | 715/513 |
| 2006/0075230 A1* | 4/2006 | Baird et al. | 713/168 |
| 2006/0095782 A1* | 5/2006 | Nunnelley | 713/184 |
| 2006/0165456 A1* | 7/2006 | Matsunaga et al. | 400/62 |
| 2006/0271781 A1* | 11/2006 | Murakawa | G06F 21/31 713/168 |
| 2007/0006323 A1* | 1/2007 | Verbowski et al. | 726/27 |
| 2008/0091681 A1* | 4/2008 | Dwivedi | G06F 21/31 |
| 2008/0222734 A1* | 9/2008 | Redlich | G06F 21/577 726/26 |
| 2009/0119765 A1* | 5/2009 | Sakayama et al. | 726/10 |

FOREIGN PATENT DOCUMENTS

| | | | |
|---|---|---|---|
| CN | 1534445 A | | 10/2004 |
| CN | 1534445 A | * | 10/2004 |
| CN | 1700227 A | | 11/2005 |
| CN | 101431594 A | | 5/2009 |
| JP | 2007-179251 | | 7/2007 |

* cited by examiner

*Primary Examiner* — Krista Zele
*Assistant Examiner* — Anthony Fabbri
(74) *Attorney, Agent, or Firm* — Frommer Lawrence & Haug LLP

(57) ABSTRACT

An authentication apparatus may include a storage unit, an analysis unit, and an authentication unit. The storage unit may be configured to store pieces of authentication information and an authentication order of the pieces of authentication information. The analysis unit may be configured to compare pieces of input information with the pieces of authentication information and to compare an input order of the pieces of input information with the authentication order. The authentication unit may be configured to authorize the pieces of input information if the comparison shows that the pieces of input information match the pieces of authentication information as necessary to authenticate and the input order of the pieces of input information matches the authentication order.

15 Claims, 18 Drawing Sheets

!R!CMNT;RESL 300;PNCH;EXIT;
~~~ORDINARY PRINT DATA~~~

FIG. 3

AUTHENTICATION-COMMAND DEFINITION PART

AUTHENTICATION ORDER ID, AUTH_1, AUTH_2, AUTH_3
AUTHENTICATION COMMAND, AAA, BBB, CCC

FIG. 4A

ORDER EXAMPLE (1) OF AUTHENTICATION COMMANDS

AUTH_1, AUTH_2, AUTH_3
AAA, BBB, CCC

FIG. 4B

ORDER EXAMPLE (2) OF AUTHENTICATION COMMANDS

AUTH_1, AUTH_2, AUTH_3
BBB, AAA, NONE

FIG. 4C

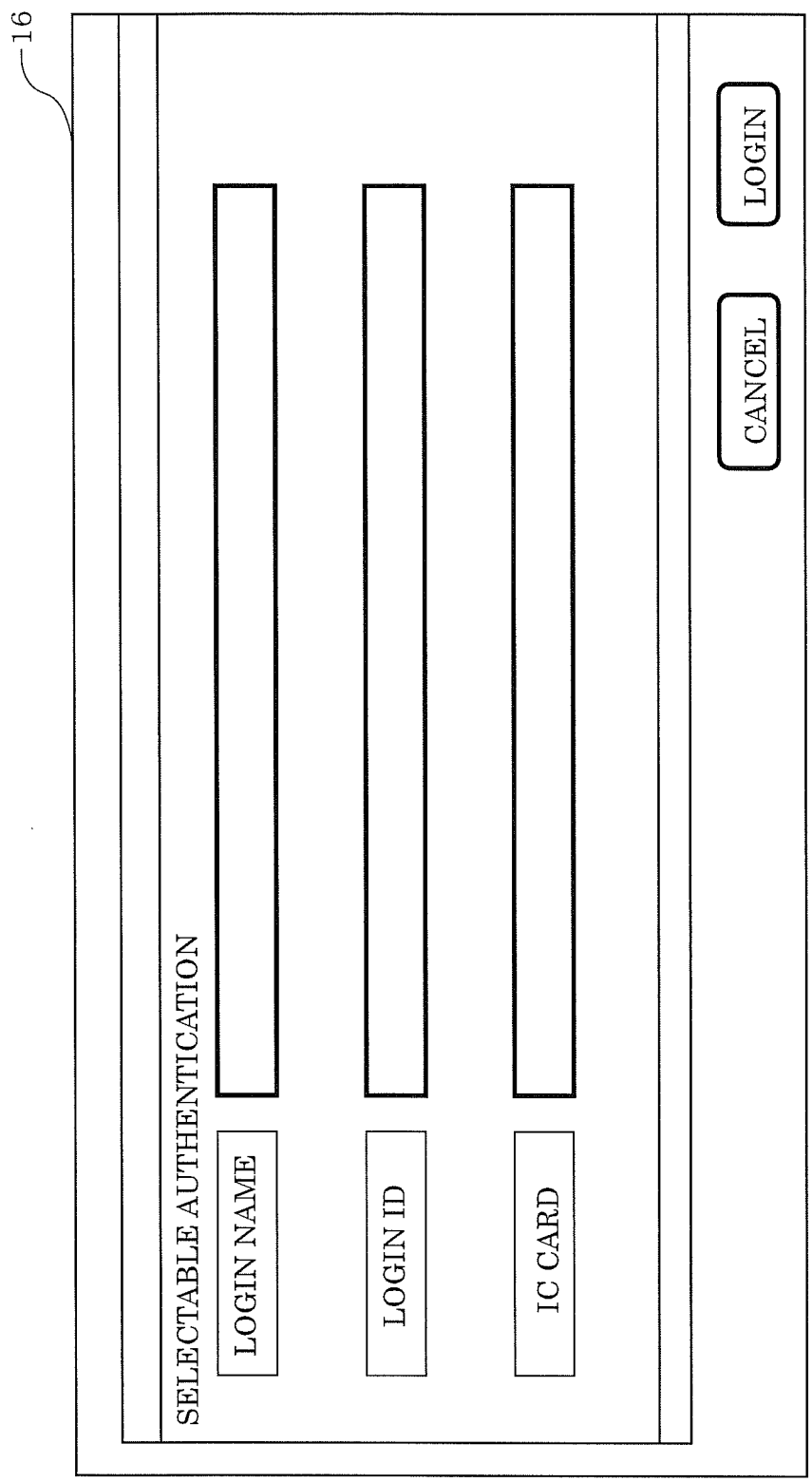

AUTHENTICATION-COMMAND DEFINITION PART

| AUTHENTICATION ORDER ID, LOGIN_NAME, LOGIN_ID, ID_CARD |
| AUTHENTICATION COMMAND, LOGIN NAME, LOGIN ID, IC CARD |

FIG. 9A

AUTHENTICATION ORDER OF "John"

| AUTHENTICATION ORDER, 1, 2 |
| John, LOGIN_NAME, LOGIN_ID |

FIG. 9B

AUTHENTICATION APPARATUS AND COMPUTER-READABLE MEDIUM STORING AUTHENTICATION PROGRAM CODE

INCORPORATION BY REFERENCE

This application is based upon and claims the benefit of priority from the corresponding Japanese Patent Application No. 2009-200759, filed Aug. 31, 2009, and Japanese Patent Application No. 2009-200760, filed Aug. 31, 2009, the entire contents of which are incorporated herein by reference.

FIELD OF THE INVENTION

Embodiments disclosed herein relate to an authentication apparatus and a computer-readable medium storing authentication program code that processes processing data received from a host computer according to commands included in the processing data.

Embodiments disclosed herein also relate to an authentication apparatus and a computer-readable medium storing authentication program code that permits use of the apparatus if information input by a user in response to a request for authentication information in use of the apparatus is matched with the authentication information registered in advance.

BACKGROUND OF THE INVENTION

In recent years, companies have been required to reinforce their internal controls. For example, the Sarbanes-Oxley Act has come into effect as a countermeasure against corporate misconduct.

To reinforce internal control, various methods for improving information security are widely known.

For example, in recording of business procedures using workflow systems, application operations and approval operations occurring in the business can be defined as workflows. Electronic document management systems are proposed in which application documents are sent and approval operations are performed according to the workflows so as to store the business procedures (histories) in the systems.

For example, MFPs (multifunction peripherals) have authentication functions and are capable of preventing unauthorized use of the apparatuses by performing user authentication in use of the apparatuses. In addition, the MFPs define access rights for each person, each post, and each department and permit the persons, posts, and departments identified by the authentication to use the apparatuses only within the range of their rights.

Specifically, the MFPs require users to input authentication information, such as login names, login IDs (identifications), and passwords, in use of the apparatuses and permit the users to use the apparatuses within their rights if the information input by the users matches authentication information that is registered in advance.

However, with such authentication methods in related art, if the authentication information including login names, login IDs, and passwords leaks out to others, the electronic devices are used without restriction to compromise internal control and possibly cause enormous damage.

In order to prevent such compromise and damage, fingerprint authentication having a higher security level may be adopted. However, such authentication systems are expensive. In addition, since different departments require different security levels even in the same company, it is difficult to introduce a uniform authentication system.

Furthermore, since each time the authentication system is changed in the related art it is necessary to modify or update documents describing and disclosing the authentication method, it is troublesome for companies to introduce and for users to perform the modification or update.

SUMMARY OF THE INVENTION

According to some embodiments of the present invention, an authentication apparatus includes a storage unit, an analysis unit, and an authentication unit. The storage unit may be configured to store pieces of authentication information and an authentication order of the pieces of authentication information. The analysis unit may be configured to compare pieces of input information with the pieces of authentication information and to compare an input order of the pieces of input information with the authentication order. The authentication unit may be configured to authorize the pieces of input information if the comparison shows that the pieces of input information match the pieces of authentication information as necessary to authenticate and the input order of the pieces of input information matches the authentication order.

According to some embodiments, at least one computer-readable medium stores authentication program code for execution by at least one computer in an authentication apparatus. The authentication program code may include two program code segments. The first program code segment, when executed by the at least one computer, is operable in causing the at least one computer to compare pieces of input information with pieces of authentication information stored in a storage unit and to compare an input order of the pieces of input information with an authentication order stored in the storage unit. The second program code segment, when executed by the at least one computer, is operable in causing the at least one computer to authorize the pieces of input information if the comparison shows that the pieces of input information match the pieces of authentication information as necessary to authenticate and the input order of the pieces of input information matches the authentication order.

According to some embodiments, an authentication apparatus includes at least one processor and program code stored on at least one computer readable medium for execution by the at least one processor. The program code when executed by the at least one processor causes the at least one processor to carry out a method. The method includes (1) an analysis unit comparing pieces of input information with pieces of authentication information stored in a storage unit and comparing an input order of the pieces of input information with an authentication order stored in the storage unit by an analysis unit; and (2) an authentication unit authorizing the pieces of input information if the comparison shows that the pieces of input information match the pieces of authentication information as necessary to authenticate and the input order of the pieces of input information matches the authentication order.

The above and other objects, features, and advantages of embodiments of the present invention will be more apparent from the following detailed description of illustrative embodiments taken in conjunction with the accompanying drawings.

In this text, the terms "comprising", "comprise", "comprises" and other forms of "comprise" can have the meaning ascribed to these terms in U.S. Patent Law and can mean "including", "include", "includes" and other forms of "include".

Various features of novelty which characterize embodiments of the invention are pointed out in particularity in the claims annexed to and forming a part of this disclosure. For a better understanding of the invention, operating advantages and specific objects that may be attained by its uses, reference is made to the accompanying descriptive matter in which exemplary embodiments of the invention are illustrated in the accompanying drawings in which corresponding components are identified by the same reference numerals.

BRIEF DESCRIPTION OF THE DRAWINGS

The following detailed description, given by way of example, but not intended to limit the invention solely to the specific embodiments described, may best be understood in conjunction with the accompanying drawings, in which:

FIG. 3 shows an example of print data that is input into the authentication apparatus according to some embodiments of the present invention;

FIGS. 4A to 4C show an example of authentication order data that is registered in the authentication apparatus according to some embodiments of the present invention;

FIG. 8 shows an example of an authentication operation screen in the authentication apparatus of FIG. 7 according to some embodiments of the present invention;

FIGS. 9A and 9B show an example of authentication order data that is registered in the authentication apparatus of FIG. 7 according to some embodiments of the present invention;

DETAILED DESCRIPTION OF THE EMBODIMENTS

Reference will now be made in detail to various embodiments of the invention, one or more examples of which are illustrated in the accompanying drawings. Each example is provided by way of explanation of the invention, and is by no way limiting the present invention. In fact, it will be apparent to those skilled in the art that various modifications, combinations, additions, deletions and variations can be made in the present invention without departing from the scope of the present invention. For instance, features illustrated or described as part of one embodiment can be used in another embodiment to yield a still further embodiment. It is intended that the present invention covers such modifications, combinations, additions, deletions, applications and variations that come within the scope of the appended claims and their equivalents.

Authentication apparatuses according to various embodiments of the present invention will herein be described. An example includes that the authentication apparatus may be, or may be incorporated in, an MFP having multiple functions of, for example, a copier, a printer, a scanner, and a facsimile. Authentication apparatuses may alternatively or additionally be implemented as or in various other systems or equipment for controlling user access thereto, such as various other document processing, information storage and/or computer network systems or equipment, such as that used in companies or other enterprises.

Figure 1:
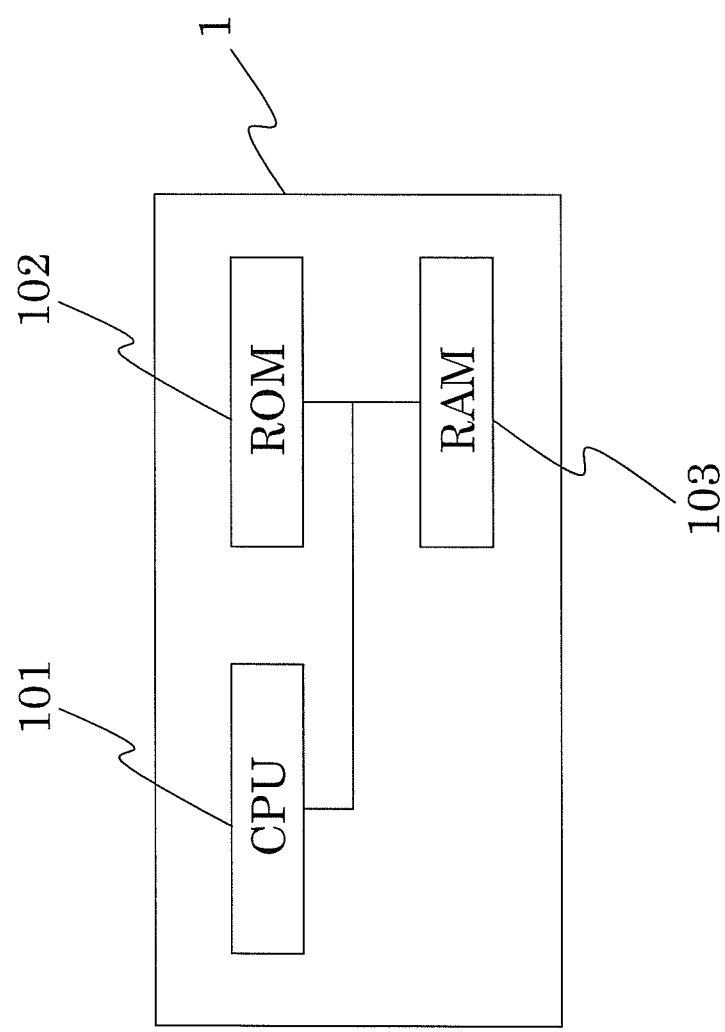
FIG. 1 shows an example of the hardware architecture of a computer in an authentication apparatus according to some embodiments of the present invention.

FIG. 1 shows an example of the hardware architecture of a computer in an authentication apparatus according to some embodiments of the present invention.

Referring to FIG. 1, illustrative authentication apparatus 1 includes a computer comprising control elements including CPU (central processing unit) 101 and a chip set (not shown), ROM (read only memory) 102, and RAM (random access memory) 103. CPU 101 includes an arithmetic processing unit for executing authentication program code. ROM 102 is a non-volatile memory that may be used to store the authentication program code and data in advance. RAM 103 may be used as a working area that temporarily stores the authentication program code and the data when the authentication program code is executed.

As will be understood by those skilled in the art, authentication program code as used herein may comprise any type of computer-readable program code executable by one or more processors so as to cause the one or more processors to implement various tasks, as described herein. It is understood that authentication program code may be implemented in any of various ways using any of various types of programming methodologies or techniques, such as various types of programming languages, data structures, programming development methodologies, programming paradigms (e.g., object-oriented), etc. It will also be understood that, in various implementations, authentication program code may access other computer-readable program code for performing one or more tasks. In addition, the authentication program code may be stored in whole on a single computer-readable medium, or various components of the authentication program code may be stored on more than one computer-readable media.

It will also be understood that, as used herein, the terms program code and program code segment, and variants thereof, are not limited to a single program or single program segment, and do not otherwise impart any specific structure, organization, technique, methodology, etc. to the program or program segment. For example, program code may be implemented as one or more executable programs, files, routines, code segments, and/or sets of processor-implementable instructions, etc. Similarly, reference herein to program codes or to program code segments (e.g., first and second program codes, or first and second program code segments) is not limited to a plurality of separate or mutually exclusive programs or program codes segments, and does not otherwise impart any specific structure, organization, technique, methodology, etc. For example, first and second program code segments may be implemented as one or more executable programs, files, routines, code segments, and/or sets of processor-implementable instructions, etc., and may, for example, share or otherwise re-use one or more subroutines, functions, or objects, etc.

Authentication apparatus 1 executes authentication program code so as to comprise an analysis unit, an authentication unit, an authentication-order registration unit, and an authentication procedure output unit, described below, in CPU 101 as functional blocks or modules. That is, in accordance with some embodiments, an authentication apparatus may comprise one or more functional modules implemented as one or more program-controlled processors. It will be understood by those skilled in the art in view of the present disclosure that authentication program code may be implemented to provide the authentication apparatus according to alternative or additional functional blocks or modules that together implement the functionality of the below described analysis unit, authentication unit, authentication-order registration unit, and authentication procedure output unit.

Some embodiments of the present invention will herein be described in detail.

For example, authentication apparatus and methods according to some embodiments of the present invention are described with reference to FIGS. 2, 3, 4A-4C, 5, and 6. More specifically, in accordance with such illustrative embodiments, FIG. 2 shows a block diagram that illustrates an example of the configuration of an authentication apparatus, FIG. 3 shows an example of print data that is input into the authentication apparatus, and FIGS. 4A to 4C show an example of authentication order data that is registered in the authentication apparatus.

The authentication apparatus according to some embodiments is configured to process print data, which is processing data received from a host computer, according to commands included in the print data.

Upon reception of print data (data described in a printer description language) shown in FIG. 3 from a host computer, the authentication apparatus executes a print processing according to print control commands (hereinafter referred to as "description commands") described in the print data. A description command to execute a punching processing while executing the print processing at a resolution of 300 dpi (dot per inch) is shown in the example in FIG. 3.

Figure 2:
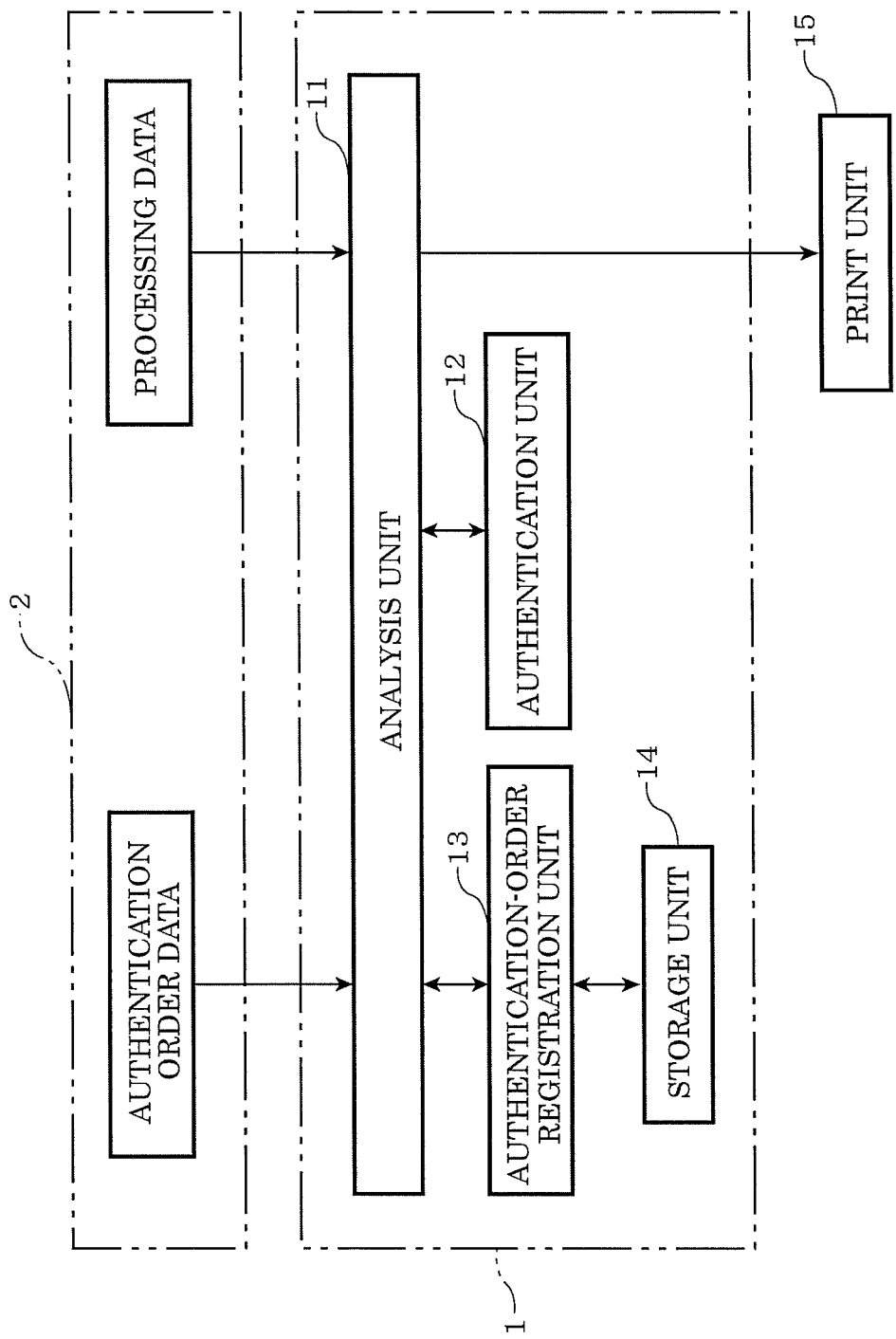
FIG. 2 shows a block diagram that illustrates an example of the configuration of an authentication apparatus according to some embodiments of the present invention.

Referring to FIG. 2, authentication apparatus 1 may include analysis unit 11, authentication unit 12, and authentication-order registration unit 13 as functional blocks (e.g., modules) realized by the execution of the authentication program code, and includes storage unit 14 as a block realized by hardware.

Storage unit 14 is a readable/writable non-volatile memory, such as a hard disk or Flash memory. Storage unit 14 stores multiple authentication commands registered by authentication-order registration unit 13 and stores the authentication order of the authentication commands.

Print unit 15 is a print engine that executes the print processing of the print data to print out an image based on the print data on a sheet of paper.

Authentication apparatus 1 according to some embodiments also includes, for example, a document reading unit, a paper feeding unit, and an eject unit (not shown) as basic components of the MFP.

The functional blocks comprising authentication apparatus 1 according to some embodiments will now be described.

According to various implementations, analysis unit 11 is configured to execute analytical processing. That is, analysis unit 11 analyzes the print data and the authentication order data received from host computer 2. As the result of the analysis of the authentication order data, if the authentication order data can be registered as the authentication commands and the authentication order of the authentication commands, analysis unit 11 supplies the authentication order data to authentication-order registration unit 13. In addition, analysis unit 11 compares the description commands in the print data with the authentication commands stored in storage unit 14 and compares the description order of the description commands with the authentication order stored in storage unit 14 to supply the result of the comparison to authentication unit 12. In some embodiments, description commands may have different values. For example, as is shown in FIG. 3, print resolution command "RESL" is set to 300 dpi. Some embodiments may include a print resolution command "RESL" having any pre-determined value, such as 300 dpi, 600 dpi, 1200 dpi, etc.

Authentication unit 12 is configured to execute authentication processing on the basis of the result of the comparison in analysis unit 11. If the authentication succeeds, authentication unit 12 permits print unit 15 to execute the print processing for the print data. According to the some embodiments, as the result of the comparison in analysis unit 11, if each authentication command is matched with any of the description commands and the description order of the description commands matched with the authentication commands is matched with the authentication order, authentication unit 12 permits print unit 15 to execute the print processing.

For example, it is assumed that three authentication commands "AAA", "BBB", and "CCC" and the authentication order are registered and stored in storage unit 14. In this example, the three authentication commands are authenticated in the authentication order of "AAA-BBB-CCC". If the print data received from host computer 2 includes the three authentication commands "AAA", "BBB", and "CCC" and their description order is "AAA-BBB-CCC", authentication unit 12 permits print unit 15 to execute the print processing for the print data. In contrast, if the print data that is received includes the three authentication commands "AAA", "BBB", and "CCC" but their description order is "AAA-CCC-BBB", "BBB-AAA-CCC", "BBB-CCC-AAA", "CCC-AAA-BBB", or "CCC-BBB-AAA" (i.e., their description order is not "AAA-BBB-CCC"), then authentication unit 12 does not permit print unit 15 to execute the print processing. Also, if the print data that is received does not include any of the three authentication commands "AAA", "BBB", and "CCC", authentication unit 12 does not permit print unit 15 to execute the print processing.

In particular, in accordance with some embodiments, existing print control commands originally used in applications other than the authentication are used as the authentication commands.

For example, as shown in FIG. 3, a comment command "CMNT", a print resolution command "RESL", and a punching command "PNCH", which have no effect on the processing result even if the description order is varied, can be used as the authentication commands.

In some implementations, even if the apparatus does not support the punching function, the punching command itself is interpreted. Accordingly, the punching command can be used as an authentication command regardless of whether authentication apparatus 1 has a punching function. Alternatively or additionally, an authentication command may comprise one or more other functions that may not be supported by the authentication apparatus.

With the authentication method using the existing commands, it is hard for others to identify the authentication commands and to recognize the fact that the authentication is performed on the basis of the description order of the commands. Accordingly, it is possible to effectively prevent unauthorized use of the apparatus.

Authentication-order registration unit 13 newly registers or overwrites the authentication commands and the authentication order of the authentication commands according to the authentication order data received from host computer 2 and stores the authentication commands and the authentication order of the authentication commands in storage unit 14. The authentication order data is supplied from analysis unit 11. As shown in FIGS. 4A to 4C, the authentication order data is described in, for example, CSV (Comma Separated Values) format. The authentication order data includes an authentication-command definition part (refer to FIG. 4A) defining the authentication commands available in the authentication and an authentication-order setting part (refer to FIGS. 4B and 4C) setting the authentication commands practically used in the authentication and the authentication order of the authentication commands.

The authentication-command definition part in the authentication order data defines identification symbols (hereinafter referred to as "authentication order IDs") (refer to the upper line in FIG. 4A) indicating the description order of the authentication commands and the names of the available authentication commands (refer to the lower line in FIG. 4A). In the example in FIG. 4A, "AUTH_1", "AUTH_2", and "AUTH_3" are defined as the authentication order IDs and "AAA", "BBB", and "CCC" are defined as the names of the available authentication commands. The number symbols following "AUTH_" in the authentication order IDs indicate the order in which the authentication commands are authenticated.

The authentication-order setting part in the authentication order data comprises combinations of the authentication order IDs (refer to the upper lines in FIGS. 4B and 4C) and the names of the authentication commands (refer to the lower lines in FIGS. 4B and 4C) practically used in the authentication. In example (1) depicted in FIG. 4B by way of illustration of an order of the authentication commands, the authentication order data may include "AUTH_1", "AUTH_2", and "AUTH_3" as the authentication order IDs. The authentication order data also may include the three authentication commands "AAA", "BBB", and "CCC". In example (1) shown in FIG. 4B, "AUTH_1" corresponds to "AAA", "AUTH_2" corresponds to "BBB", and "AUTH_3" corresponds to "CCC". This means that, in this example, the authentication order of the authentication commands is "AAA-BBB-CCC".

In accordance with various implementations, the order of some of the authentication commands that are defined (e.g., at least two authentication commands, but not all of the defined authentication commands) may be authenticated. For example, as shown in an order example (2) of the authentication commands in FIG. 4C, the two authentication commands "AAA" and "BBB", among the three authentication commands ("AAA", "BBB", and "CCC") defined in FIG. 4A, may have an authentication order "BBB-AAA". "NONE" indicates that no authentication command is set. Since "NONE" corresponds to "AUTH_3" in the example in FIG. 4C, there is no authentication command at the third place of the authentication order. Therefore, the determination of whether the print processing is permitted is based on the two authentication commands and their authentication order.

With authentication-order registration unit 13 described above, the authentication order data can be transmitted from host computer 2 to authentication apparatus 1 to easily register the authentication order.

In addition, the rights to register the authentication order are given to, for example, persons, posts, and departments. By appropriately changing the authentication order for every person, post, and department, unauthorized use of authentication apparatus 1 is effectively prevented.

Illustrative authentication-order registration processing and authentication processing in the authentication apparatus according to some embodiments of the present invention will now be described with reference to FIGS. 5 and 6. It is assumed in the authentication-order registration processing in FIG. 5 that a user has logged in to the authentication apparatus.

Figure 5:
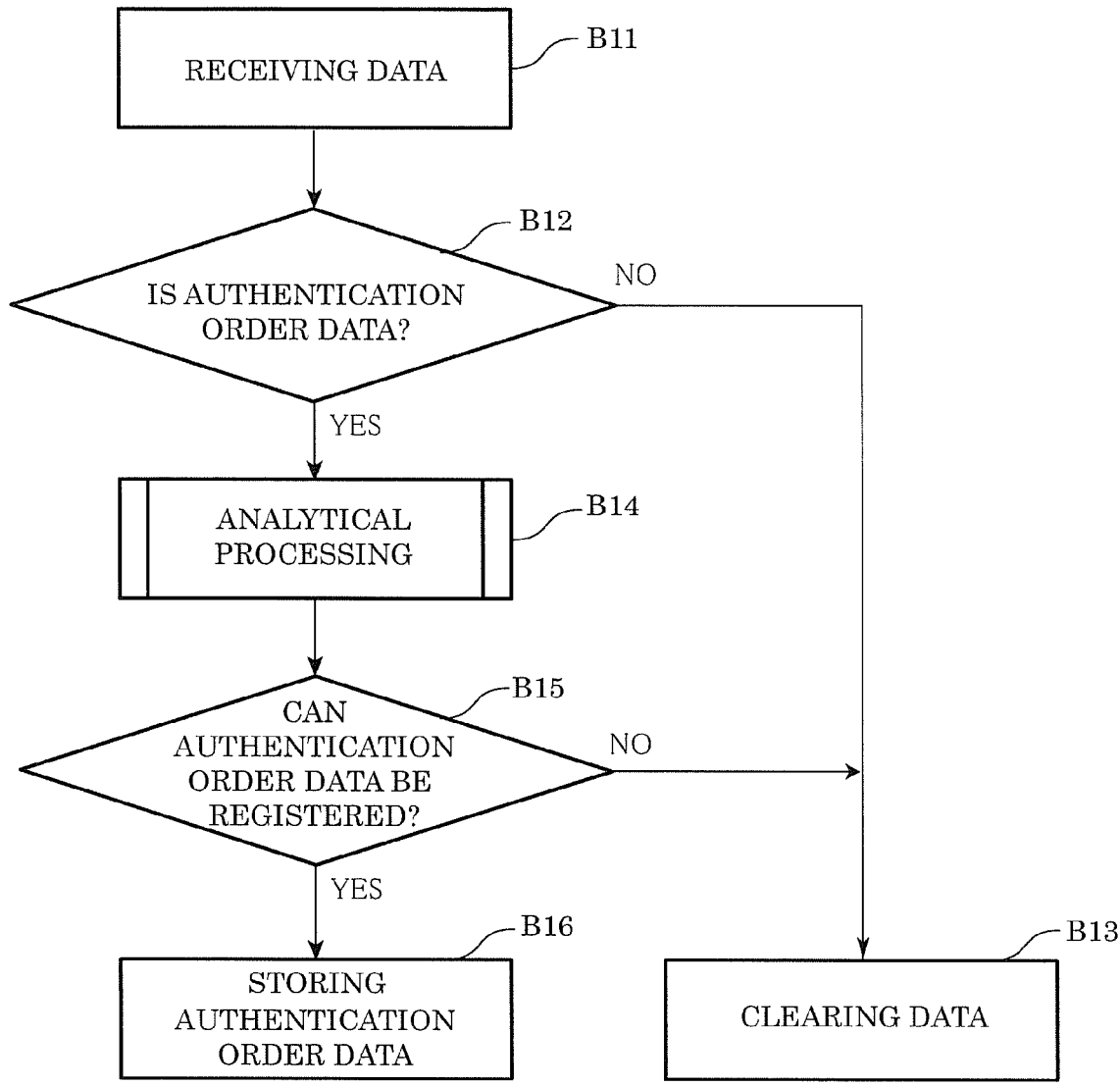
FIG. 5 shows a flowchart that illustrates an example of authentication-order registration processing in the authentication apparatus according to some embodiments of the present invention.

FIG. 5 shows a flowchart that illustrates an example of authentication-order registration processing in the authentication apparatus according to some embodiments of the present invention.

Referring to FIG. 5, when the authentication order is newly registered in the authentication apparatus or the authentication order that is registered in advance is changed (overwritten), in Block B11, the authentication apparatus receives data from the host computer.

In Block B12, the analysis unit determines whether the received data is the authentication order data.

If the analysis unit determines that the received data is not the authentication order data (NO in Block B12), then in Block B13, the analysis unit clears the received data.

If the analysis unit determines that the received data is the authentication order data (YES in Block B12), then in Block B14, the analysis unit analyzes the authentication order data.

Specifically, the analytical processing in Block B14 comprises the analysis unit determining the format (e.g., CSV format, a text format, or a specific format) of the authentication order data and extracting the authentication order IDs and the authentication commands. For example, in the CSV format, the content of comma-delimited data shown in FIGS. 4A to 4C is read out.

After the analytical processing, in Block B15, the analysis unit determines whether the authentication order data can be registered as the authentication order. Specifically, the analysis unit may check various determination criteria. For example, the analysis unit may determine whether the authentication order data exceeds the limited number of characters, whether the commands that have no effect on the processing result even if the description order is varied are used in the authentication order data, and whether the command names are duplicated in the authentication order data.

If the analysis unit determines that the authentication order data cannot be registered as the authentication commands and the authentication order of the authentication commands (NO in Block B15), then in Block B13 the analysis unit clears the authentication order data.

If the analysis unit determines that the authentication order data can be registered as the authentication commands and the authentication order of the authentication commands (YES in Block B15), then the analysis unit supplies the authentication order data to the authentication-order registration unit. In Block B16, the authentication-order registration unit stores the authentication order data supplied from the analysis unit in the storage unit. Thus, according to some embodiments, the authentication order is newly registered or overwritten in the above manner.

Figure 6:
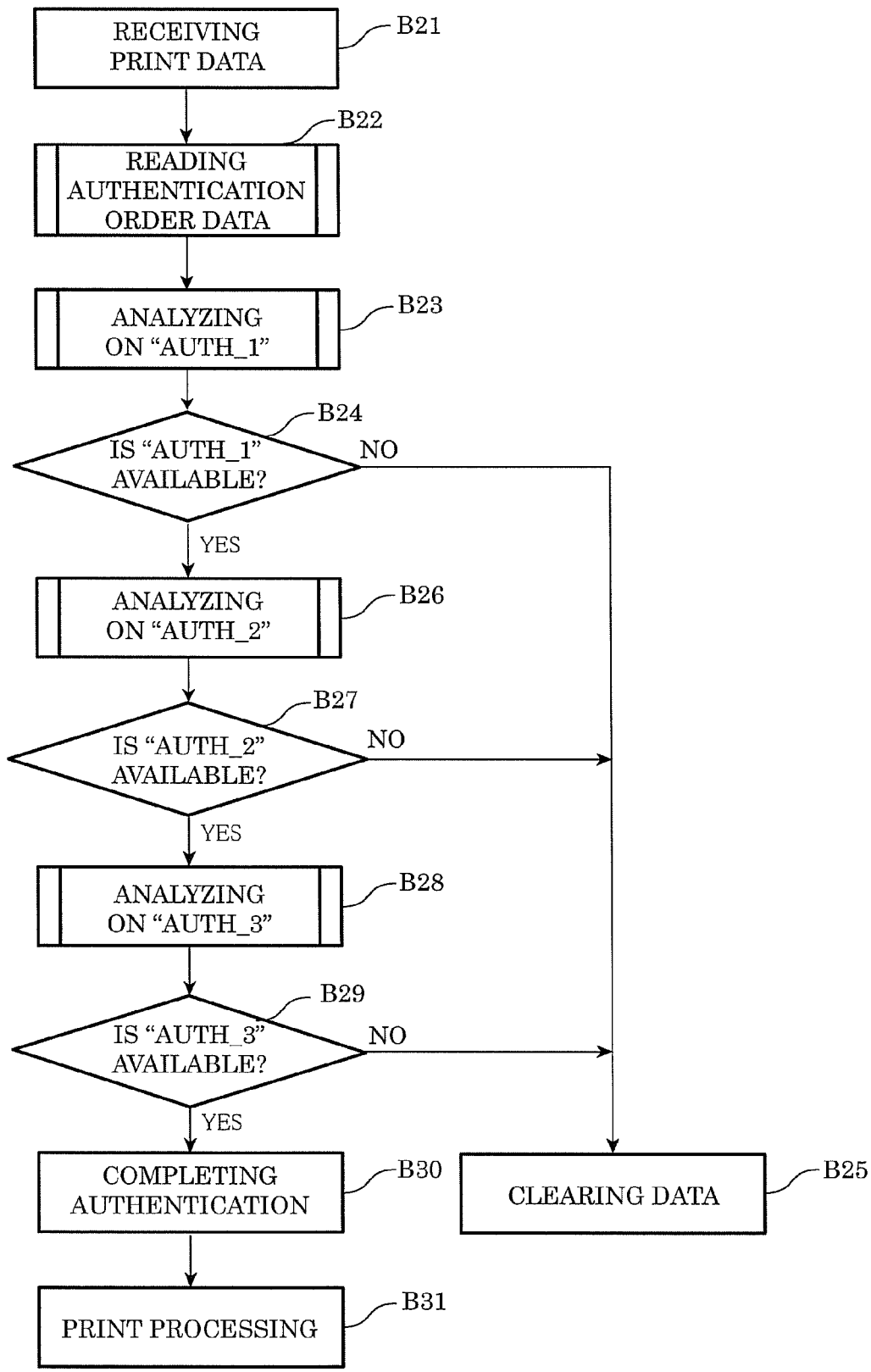
FIG. 6 shows a flowchart that illustrates an example of authentication processing in the authentication apparatus according to some embodiments of the present invention.

FIG. 6 shows a flowchart that illustrates an example of the authentication processing in the authentication apparatus according to some embodiments of the present invention.

Referring to FIG. 6, in Block B21, the authentication apparatus receives print data from the host computer. In Block B22, the analysis unit reads the authentication order data that is registered in the authentication-order registration processing and is stored in the storage unit. In Block B23, the analysis unit compares the description commands in the print data with the first authentication command (the authentication command corresponding to "AUTH_1").

For example, when the authentication is performed on the basis of the authentication order shown in FIG. 4B, the analysis unit compares the description commands in the print data with the first authentication command "AAA". In Block B24, the analysis unit determines whether the first authentication command "AAA" matches any of the description commands, that is, whether the description command "AAA" to be matched with the authentication command is included in the print data.

If the analysis unit determines that the description command "AAA" is not included in the print data (NO in Block B24), then in Block B25 the authentication unit rejects the comparison of the second authentication command and clears the print data.

If the analysis unit determines that the description command "AAA" is included in the print data (YES in Block B24), the authentication unit permits the comparison of the second authentication command.

If the comparison of the second authentication command is permitted in Block B24, then in Block B26 the analysis unit compares the description commands in the print data with the second authentication command (e.g., "BBB" corresponding to "AUTH_2").

For example, when the authentication is performed on the basis of the authentication order shown in FIG. 4B, the analysis unit compares the description commands in the print data with the second authentication command "BBB". Specifically, the analysis unit determines whether the second authentication command "BBB" matches any of the description commands; that is, whether the description command "BBB" is included in the print data. If the analysis unit determines that the description command "BBB" is included in the print data, then in Block B27 the analysis unit determines whether "BBB" is described after "AAA" in the print data.

If the analysis unit determines that the description command "BBB" is not included in the print data (NO in Block B27), then in Block B25 the authentication unit rejects the comparison of the third authentication command and clears the print data. Also, if the analysis unit determines that the description command "BBB" is included in the print data but "BBB" is described before "AAA" in the print data (NO in Block B27), then in Block B25 the authentication unit rejects the comparison of the third authentication command and clears the print data.

If the analysis unit determines that the description command "BBB" is included in the print data and "BBB" is described after "AAA" in the print data (YES in Block B27), then the authentication unit permits the comparison of the third authentication command.

If the comparison of the third authentication command is permitted in Block 327, then in Block B28 the analysis unit compares the description commands in the print data with the third authentication command (e.g., "CCC" corresponding to "AUTH_3").

For example, when the authentication is performed on the basis of the authentication order shown in FIG. 4B, the analysis unit compares the description commands in the print data with the third authentication command "CCC". Specifically, the analysis unit determines whether the third authentication command "CCC" matches any of the description commands, that is, whether the description command "CCC" is included in the print data. If the analysis unit determines that the description command "CCC" is included in the print data, then in Block B29 the analysis unit determines whether "CCC" is described after "BBB" in the print data.

If the analysis unit determines that the description command "CCC" is not included in the print data (NO in Block B29), then in Block B25 the authentication unit rejects the execution of the print processing for the print data and clears the print data. Also, if the analysis unit determines that the description command "CCC" is included in the print data but "CCC" is described before "BBB" in the print data (NO in Block B29), then in Block B25 the authentication unit rejects the execution of the print processing for the print data and clears the print data.

If the analysis unit determines that the description command "CCC" is included in the print data and "CCC" is described after "BBB" in the print data (YES in Block B29), then in Block B30 the authentication unit completes the authentication of the print data. Then, the authentication unit permits the execution of the print processing for the print data.

After the execution of the print processing is permitted, in Block B31 the print unit prints out on a sheet of paper an image based on the print data.

As described above, according to some embodiments, when the first to third authentication commands are registered, the print data is subjected to the print processing if each of the first to third authentication commands matches any of the description commands in the print data and the description order of the description commands matched with the first to third authentication commands matches the authentication order.

According to some embodiments having a configuration such as that described hereinabove, the authentication apparatus may be configured to include a storage unit, an analysis unit, and an authentication unit. Specifically, the storage unit may be configured to store the multiple authentication commands and the authentication order of the authentication commands. The analysis unit may be configured to compare the commands described in the processing data received from the host computer with the authentication commands stored in the storage unit and to compare the description order of the description commands in the print data with the authentication order stored in the storage unit. The authentication unit may be configured to permit the execution of the print processing for the print data if the comparison in the analysis unit shows that each of the authentication commands matches any of the description commands and the description order of the description commands matched with the authentication commands matches the authentication order.

With the above configuration, it is possible to effectively prevent unauthorized use of the apparatus due to leakage of the authentication information, thus providing for reinforcing internal controls.

In addition to the above configuration, the authentication apparatus may include the authentication-order registration unit configured to register the authentication commands and the authentication order of the authentication commands according to the authentication order data received from the host computer and to store the authentication commands and the authentication order of the authentication commands in the storage unit.

With the above configuration, only transmitting the authentication order data from host computer 2 to authentication apparatus 1 allows the authentication order to be easily registered. In addition, the rights to register the authentication order are given to, for example, persons, posts, and departments. Appropriately changing the authentication order for every person, post, and department allows unauthorized use of the authentication apparatus 1 to be more effectively prevented.

In accordance with some embodiments such as described hereinabove, print control commands used in the print processing for the print data can be used as the authentication commands.

Consequently, authentication methods and systems employing print control commands as authentication commands in accordance with embodiments as described above have advantages in that it is hard for others to identify the authentication commands and to recognize the fact that the authentication is performed on the basis of the description order of the commands.

In other words, since it is hard for others to recognize the authentication commands as the authentication information, even if the others know the authentication commands it is possible to effectively prevent unauthorized use of the apparatus.

In addition, in some implementations, commands having no effect on the processing result even if the authentication order is varied can be used as the authentication commands.

Consequently, since the authentication method can be varied according to the description order of the description commands, the authentication method may offer the advantage of being easily varied without necessarily changing the authentication commands.

Directly inputting the description commands matched with the authentication commands in the print data in the description order matched with the authentication order allows the user to generate the print data that can be used in the authentication apparatus of the hereinabove described embodiments. This operation may be performed with a printer driver in the host computer. For example, the user sets the authentication commands and the authentication order of the authentication commands with the printer driver in the host computer in the registration of the authentication data. In this case, the printer driver describes the description commands that are set in the description order that is set in the generation of the print data.

Although an authentication method using two or three authentication commands is described in the hereinabove illustrative embodiments, these and other embodiments are not limited to this method. For example, an authentication method using four or more authentication commands may be used. Since the variation in the authentication order is further increased in the case of additional authentication commands, it is possible to implement additional authentication commands to further improve the security level.

Figure 7:
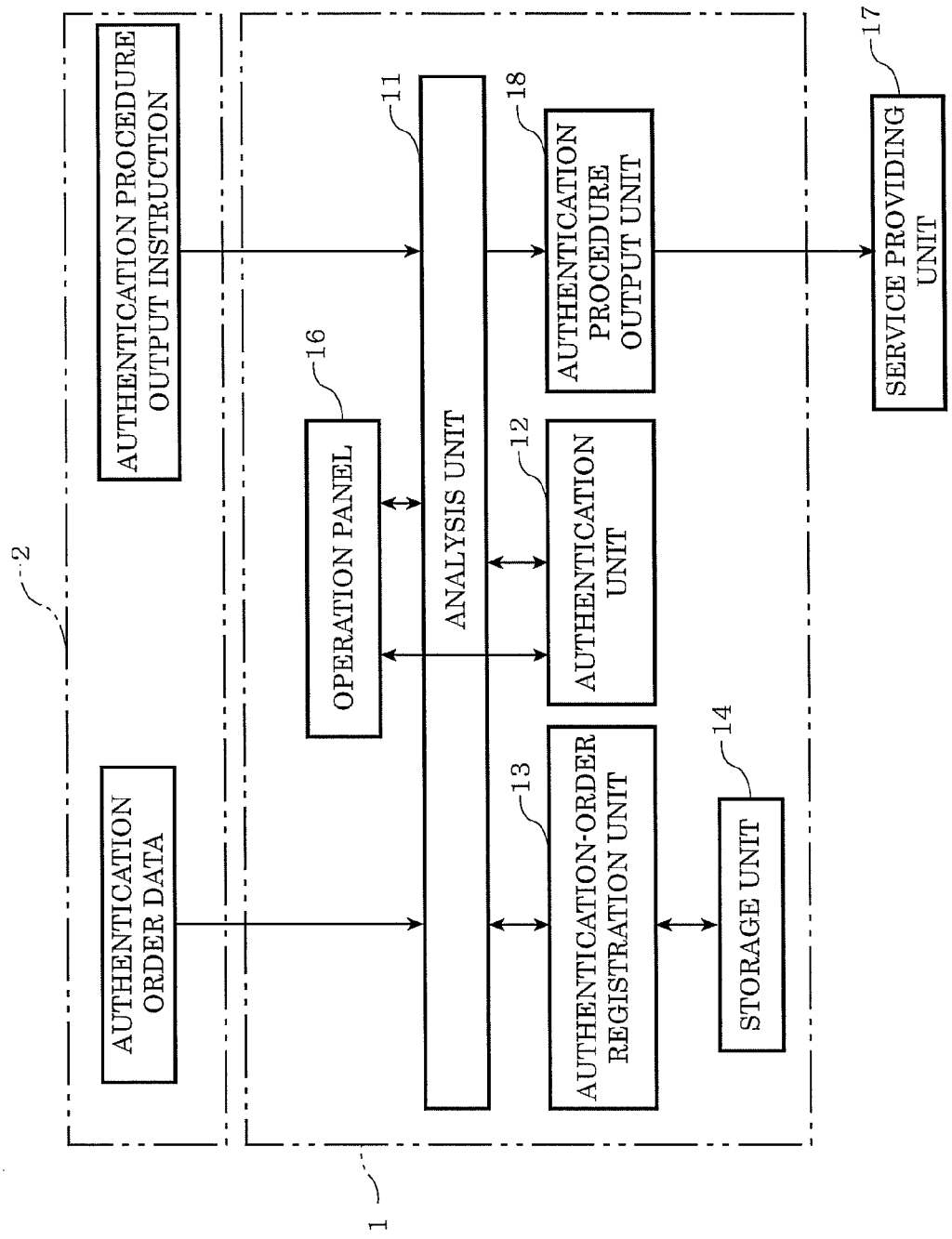
FIG. 7 shows a block diagram that illustrates an example of the configuration of an authentication apparatus according to some embodiments of the present invention.
Figure 10:
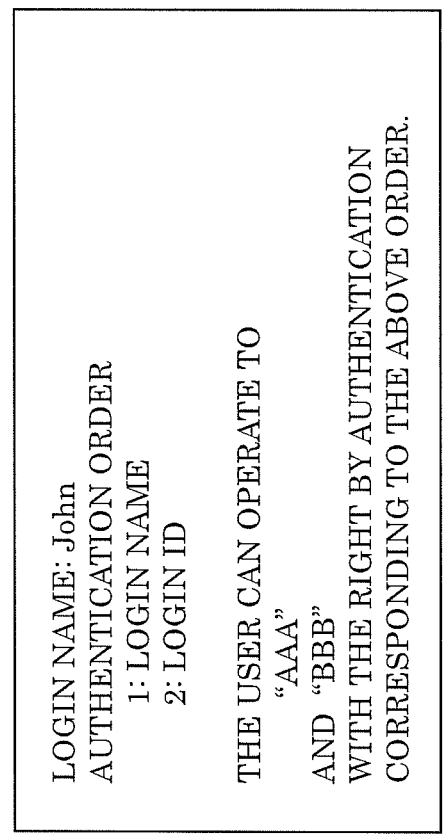
FIG. 10 shows an example of an authentication procedure that is output by the authentication apparatus of FIG. 7 according to some embodiments of the present disclosure.

Referring now to FIGS. 7, 8, 9A, 9B, and 10-12, alternative and/or additional embodiments of the present invention are now described. More specifically, in accordance with such embodiments, FIG. 7 shows a block diagram that illustrates an example of a configuration of an authentication apparatus; FIG. 8 shows an example of an authentication operation screen in the authentication apparatus; FIGS. 9A and 9B show an example of authentication order data that may be registered in the authentication apparatus; and FIG. 10 shows an example of an authentication procedure that may be output by the authentication apparatus.

The authentication apparatus according to such illustrative alternative and/or additional embodiments may be configured to permit the use of the apparatus if information input by a user in response to a request for authentication information submitted in use of the apparatus matches the authentication information registered in advance.

In some such embodiments, the use of the authentication apparatus is permitted on the basis of authentication information that is registered in advance and that may be input on an authentication operation screen such as that shown in FIG. 8.

The authentication information may be input from a host computer connected to the authentication apparatus so as to allow the communication with the authentication apparatus, instead of being directly input on the authentication operation screen of the authentication apparatus.

Referring to FIG. 7, authentication apparatus 1 according to some embodiments includes analysis unit 11, authentication unit 12, authentication-order registration unit 13, and authentication procedure output unit 18 as functional blocks realized by the execution of authentication program code, and includes storage unit 14, operation panel (operation unit) 16, and service providing unit 17 as blocks realized by hardware.

Storage unit 14 is a readable/writable non-volatile memory, such as a hard disk or Flash memory. Storage unit 14 stores authentication information registered by authentication-order registration unit 13 and the authentication order of the authentication information.

Operation panel 16 is an input device including, for example, a liquid crystal display and a transparent touch panel over the liquid crystal display. For example, operation screens, such as the authentication operation screen and an authentication procedure setting screen, and a notification screen used to notify the user of the state of authentication apparatus 1, the operation result, etc. may be displayed on the liquid crystal display. The touch panel detects a contact operation by the user. Operation panel 16 accepts the input operation detected by the touch panel and supplies input information corresponding to the input operation to the analysis unit.

Service providing unit 17 provides a print service, a copy service, a scanning service, and a facsimile service to the user. Service providing unit 17 includes a print engine, a scanner device, and a facsimile device and operates these hardware elements to provide various services. In particular, in the print service, service providing unit 17 executes the print processing for the print data and the authentication procedure data to print out on a sheet of paper an image based on the data.

Authentication apparatus 1 of some embodiments may also include, for example, a document reading unit, a paper feeding unit, and an eject unit (not shown) as basic components of the MFP.

The illustrative functional blocks included in authentication apparatus 1 according to embodiments illustrated by FIGS. 7, 8, 9A, 9B, and 10-12 will now be described.

Analysis unit 11 is configured to execute analytical processing. That is, analysis unit 11 is configured for analyzing the authentication order data and an authentication procedure output instruction received from host computer 2. Analysis unit 11 also analyzes the input information supplied from operation panel 16. Specifically, if the authentication order data that is analyzed can be registered as the authentication information and the authentication order of the authentication information, analysis unit 11 supplies the authentication order data to authentication-order registration unit 13. Analysis unit 11 analyzes the authentication procedure output instruction to extract information described in the authentication procedure from storage unit 14. Analysis unit 11 supplies the extracted description information to authentication procedure output unit 18. In addition, analysis unit 11 compares the input information supplied from operation panel 16 with the authentication information stored in storage unit 14 and compares the input order of the input information with the authentication order stored in storage unit 14 to supply the result of the comparison to authentication unit 12.

Authentication unit 12 performs the user authentication in use of the apparatus to permit the user to use the apparatus within the range of the rights given to the user. According to some embodiments, authentication unit 12 requests the user to input multiple pieces of authentication information. Authentication unit 12 supplies the multiple pieces of input information by the user to analysis unit 11. If the comparison in analysis unit 11 shows that each of the pieces of input information matches any of the multiple pieces of authentication information and the input order of the multiple pieces of input information matches the authentication order, authentication unit 12 permits the use of service providing unit 17.

For example, in accordance with some implementations, it is assumed that (i) three pieces of authentication information, namely, a login name, a login ID, and a password of the user, and (ii) the authentication order are registered and are stored in storage unit 14. By way of example, the three pieces of authentication information may be authenticated in the authentication order of "password-login name-login ID". Authentication unit 12 displays a screen to prompt the user to input the login name, the login ID, and the password through operation panel 16. If the login name, the login ID, and the password input by the user with operation panel 16 match the authentication information registered in advance and the input order of the login name, the login ID, and the password is set to the order "password-login name-login ID", then authentication unit 12 permits the use of service providing unit 17.

In contrast, if the input order is not "password-login name-login ID" but is "login name-login ID-password", "login name-password-login ID", "login ID-login name-password", "login ID-password-login name", or "password-login ID-login name", then even when the login name, the login ID, the password that are input match the authentication information registered in advance, authentication unit 12 does not permit the use of service providing unit 17. Also, if at least one of the login name, the login ID, and the password that are input do not match the authentication information, then authentication unit 12 does not permit the use of service providing unit 17.

With authentication unit 12 described above, even if the authentication information including the login name, the login ID, and the password leaks out, only the user knows the authentication order of the authentication information. Accordingly, it is possible to effectively prevent unauthorized use of the apparatus.

In addition, since the authentication method is varied according to the authentication order, the authentication method offers the advantage of being easily varied without necessarily changing the authentication information, such as the password. As a result, it is possible to further improve the security level.

Authentication-order registration unit 13 newly registers or overwrites the authentication information and the authentication order of the authentication information according to the authentication order data received from host computer 2. The authentication order data is supplied from analysis unit 11. As shown in FIGS. 9A and 9B, the authentication order data is described in, for example, CSV format. The authentication order data may include an authentication-information definition part (refer to FIG. 9A) defining the kind of the authentication information used in the user authentication and an authentication-order setting part (refer to FIG. 9B) setting the kind of the authentication information practically required in the authentication and the authentication order of the authentication information.

The authentication-information definition part in the authentication order data may comprise combinations of identification symbols (hereinafter referred to as "authentication information IDs") (refer to the upper line in FIG. 9A) given to the pieces of the authentication information and display names (refer to the lower line in FIG. 9A) indicating the pieces of the authentication information. For example, in the authentication order data in FIG. 9A, a login name, a login ID, and an IC card are defined as the pieces of authentication information used in the user authentication. Furthermore, "LOGIN_NAME", "LOGIN_ID", and "ID_CARD" are defined as the authentication information IDs corresponding to the pieces of authentication information. The login name corresponds to "LOGIN_NAME", the login ID corresponds to "LOGIN_ID", and the IC card corresponds to "ID_CARD" in the authentication order data in FIG. 9A.

The authentication-order setting part in the authentication order data may comprise combinations of figures (refer to the upper line in FIG. 9B) indicating the authentication order of the pieces of authentication information and authentication information IDs (refer to the lower line in FIG. 9B). In the authentication order data in FIG. 9B, "LOGIN_NAME-LOGIN_ID" is set as the authentication order of a user "John". As described above, since "LOGIN_NAME" and "LOGIN_ID" correspond to the login name and the login ID, respectively, an authentication order "login name-login ID" is set here. Since the login name and the login ID of the user "John" is registered and stored in storage unit 14 in authentication apparatus 1 in advance, the above authentication order is referred to in the authentication of the user "John".

With authentication-order registration unit 13 described above, the authentication order data can be transmitted from host computer 2 to authentication apparatus 1 to easily register the authentication order.

In addition, the rights to register the authentication order are given to, for example, persons, posts, and departments. By appropriately changing the authentication order for every person, post, and department, unauthorized use of the authentication apparatus 1 is effectively prevented.

In this case, if the authentication order to be registered differs from the arrangement order of various authentication information input fields on the authentication operation screen, the probability of accidental coincidence of the authentication order can be decreased.

In addition, since an authentication information input field that is not necessary for the authentication or a pseudo-authentication information input field (for example, the IC card) may also displayed, such as shown in FIG. 8, it is harder for others to recognize the authentication order.

Authentication procedure output unit 18 outputs (prints out) an authentication procedure including the above authentication order according to the information described in the authentication procedure, supplied from analysis unit 11.

For example, as shown in FIG. 10, the authentication procedure may include a part in which the login name is described, a part in which the authentication order (login order) registered in association with the login name is described, and a part in which the rights given to the login name are described.

In the authentication procedure shown in FIG. 10, "John" is described as the login name, an input order "login name-login ID" is described as the authentication order registered in association with the login name, and "AAA" and "BBB" are described as the rights given to the login name.

"AAA" and "BBB" in FIG. 10 denote the identification names of operation rights. For example, if the authentication apparatus 1 is an MFP, a copy right, a facsimile operation right, and/or a scanning right corresponds to "AAA" and "BBB".

With authentication procedure output unit 18 described above, only transmitting the authentication procedure output instruction from host computer 2 to authentication apparatus 1 when it is necessary to disclose the authentication order in authentication apparatus 1 to a third person allows the authentication procedure including the authentication order to be output.

Illustrative authentication-order registration processing, authentication processing, and authentication procedure output processing in the authentication apparatus according to some embodiments of the present invention will now be described with reference to FIGS. 11 and 12. It is assumed in the authentication procedure output processing in FIG. 12 that the user has logged in to the authentication apparatus.

The authentication-order registration processing in an authentication apparatus according to embodiments such as represented by FIG. 7 disclosure may be, for example, performed essentially the same as for embodiments of an authentication apparatus as represented by FIG. 2. For example, authentication-order registration processing in the authentication apparatus according to embodiments such as represented by FIG. 7 may be performed in the following manner, which is similar to the process described in connection with FIG. 5 hereinabove.

When the authentication order is newly registered in the authentication apparatus or the authentication order that is registered in advance is changed (overwritten), the authentication apparatus receives data from the host computer.

The analysis unit determines whether the received data is the authentication order data.

If the analysis unit determines that the received data is not the authentication order data, the analysis unit clears the received data.

If the analysis unit determines that the received data is the authentication order data, the analysis unit analyzes the authentication order data.

Specifically, the analysis unit determines the format (e.g., CSV format, a text format, or a specific format) of the authentication order data and extracts the authentication information IDs, the authentication information, and the authentication order in the analytical processing. For example, in CSV format, the content of comma-delimited data shown in FIGS. 9A and 9B may be read out.

After the analytical processing, the analysis unit determines whether the authentication order data can be registered as the authentication order. Specifically, the analysis unit checks various determination criteria. For example, the analysis unit may determine whether the authentication order data exceeds the limited number of characters, whether forbidden characters are used in the authentication order data, and whether the login IDs are duplicated in the authentication order data.

If the analysis unit determines that the authentication order data cannot be registered as the authentication information and the authentication order of the authentication information, the analysis unit clears the authentication order data.

If the analysis unit determines that the authentication order data can be registered as the authentication information and the authentication order of the authentication information, the analysis unit supplies the authentication order data to the authentication-order registration unit. The authentication-order registration unit stores the authentication order data supplied from the analysis unit in the storage unit. Thus, in some embodiments, the authentication order may be newly registered or overwritten in the above manner.

Figure 11:
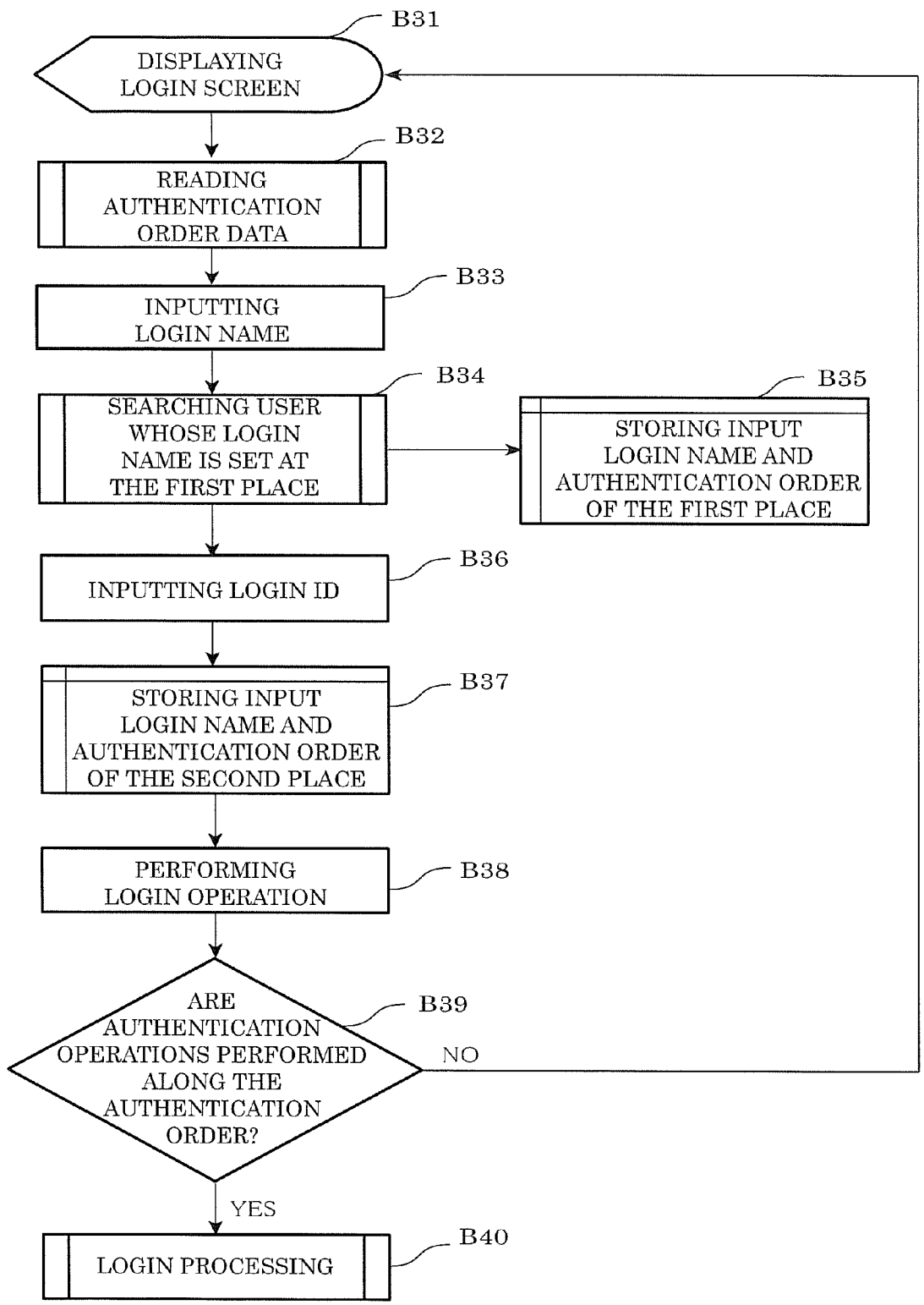
FIG. 11 shows a flowchart that illustrates an example of an authentication processing in the authentication apparatus of FIG. 7 according to some embodiments of the present invention.

FIG. 11 shows a flowchart that illustrates an example of the authentication processing in the authentication apparatus according to some embodiments of the present invention, such as embodiments employing an authentication apparatus configured according to FIG. 7.

Referring to FIG. 11, in Block B31, the operation panel displays the authentication operation screen (login screen), as shown in FIG. 8, when the user authentication is performed in use of the authentication apparatus.

In Block B32, the analysis unit reads the authentication order data that is registered in the above authentication-order registration processing and is stored in the storage unit from the storage unit.

Then, the analysis unit determines the input operation by the user on the authentication operation screen. For example, on the authentication operation screen shown in FIG. 8, the user can perform an input operation of the login name, an input operation of the login ID, a reading and execution operation of the IC card, and a login operation, and the analysis unit determines these operations.

It is assumed in the flowchart shown in FIG. 11 that the authentication order data shown in FIGS. 9A and 9B is registered and stored in the storage unit and the login operation is performed after the input operation of the login name and the input operation of the login ID are sequentially performed.

In Block B33, the login name is input on the authentication operation screen on the operation panel. In Block B34, the analysis unit searches for the authentication information about the user whose login name is set at the first place of the authentication order. In Block B35, the analysis unit stores the login name that is input and the fact that the login name is at the first place of the input order in the working area.

In Block B36, the login ID is input on the authentication operation screen on the operation panel. In Block B37, the analysis unit stores the login ID that is input and the fact that the login ID is at the second place of the input order in the working area.

In Block B38, the login operation is performed on the authentication operation screen on the operation panel. Then, the analysis unit compares the input information (the login name and the login ID) stored in the working area of the storage unit with the authentication information (the login name and the login ID) stored in the storage unit and compares the input order (login name-login ID) of the input information with the authentication order (login name-login ID). In Block B39, the authentication unit receives the result of the comparison in the analysis unit to determine whether the series of authentication operations are performed on the basis of the authentication order registered in advance.

Specifically, the authentication unit determines whether each of the pieces of input information by the user matches any of the pieces of authentication information registered in advance and whether the input order of the pieces of input information matches the authentication order registered in advance.

If the authentication unit determines that the series of authentication operations are performed on the basis of the authentication order registered in advance (YES in Block B39), then in Block B40, a login processing is executed to permit the use of the service providing unit.

If the authentication unit determines that the series of authentication operations are not performed on the basis of the authentication order registered in advance (NO in Block B39), the login processing is not executed and the authentication operation screen is returned to an initial state (Block B31). Specifically, the login processing is not executed if the login name and/or the login ID that is input as the input information differ from the authentication information, if the reading of the IC card is performed, or if the input order is "login ID-login name".

Figure 12:
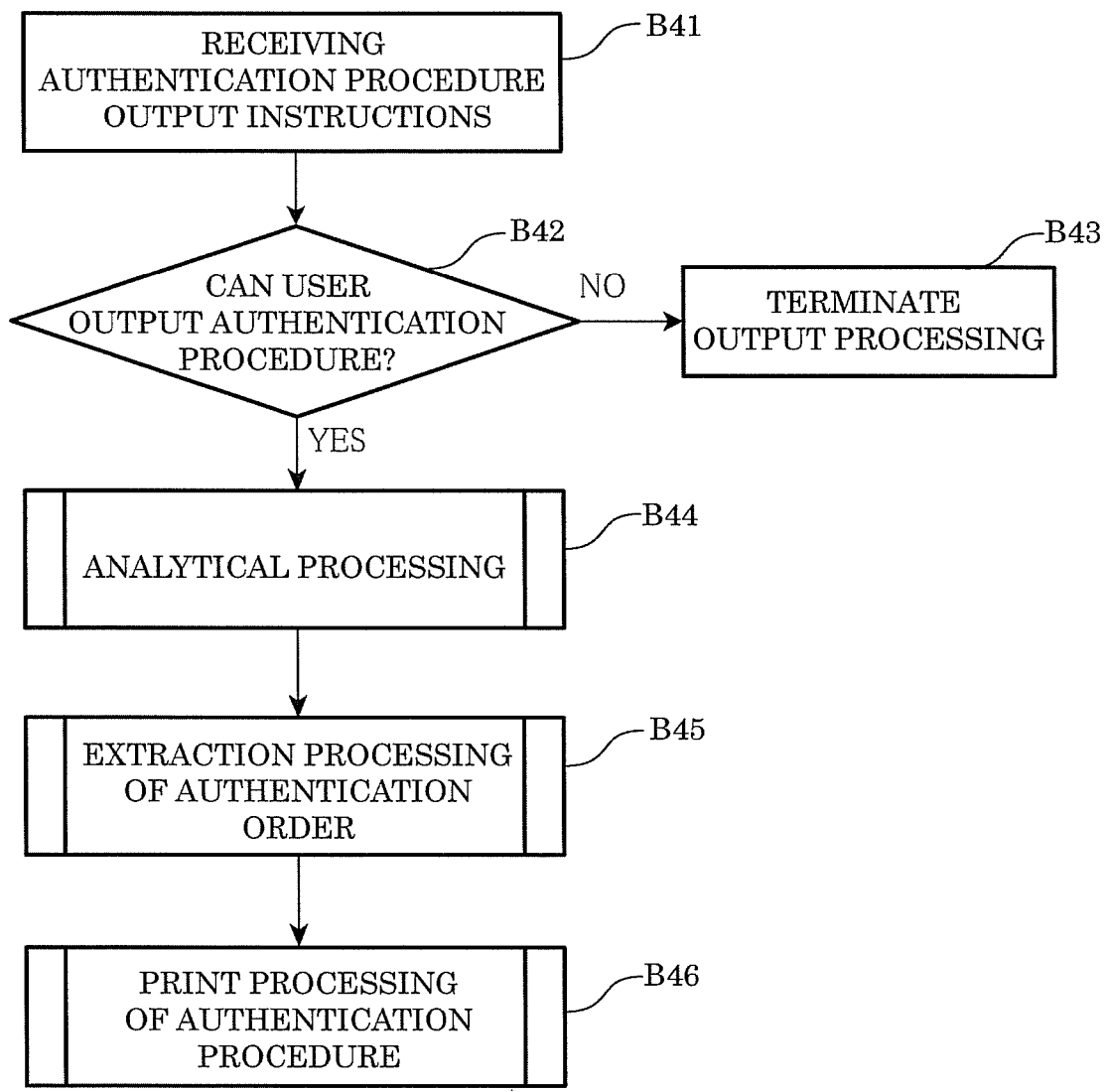
FIG. 12 shows a flowchart that illustrates an example of an authentication procedure output processing in the authentication apparatus of FIG. 7 according to some embodiments of the present invention.

FIG. 12 shows a flowchart that illustrates an example of the authentication procedure output processing in the authentication apparatus according to the some embodiments of the present invention, such as embodiments employing an authentication apparatus configured according to FIG. 7.

Referring to FIG. 12, in Block B41 the authentication apparatus receives the authentication procedure output instruction from the host computer in the output of the authentication procedure.

In Block B42, the authentication unit determines whether the user who has logged in has a right to output the authentication procedure.

If the authentication unit determines that the user does not have the right (NO in Block B42), then in Block B43 the authentication procedure output processing is terminated without being executed.

If the authentication unit determines that the user has the right (YES in Block B42), then in Block B44 the analysis unit performs the analysis in response to the authentication procedure output instruction.

In Block B45, the analysis unit extracts information described in the authentication procedure from the storage unit. For example, when the authentication procedure shown in FIG. 10 is output, the login name, the authentication order registered in association with the login name, and the right(s) given to the login name are extracted as the description information. The analysis unit supplies the extracted description information to the authentication procedure output unit.

The authentication procedure output unit generates print data on the authentication procedure on the basis of the description information supplied from the analysis unit and supplies the generated print data to the print unit. In Block B46, the print unit prints out the authentication procedure on the basis of the print data on the authentication procedure, supplied from the authentication procedure output unit. Then, the authentication procedure output processing is terminated.

As described above, with the authentication apparatus according to embodiments such as represented by FIGS. 7, 8, 9A, 9B, and 10-12, it is possible to effectively prevent unauthorized use of the apparatus even if the authentication information including the login name, the login ID, and the password leaks out to others.

In addition, since the authentication method may be varied according to the authentication order, the authentication method offers, for example, the advantage of being easily varied without requiring changing the authentication information, such as the password.

Furthermore, only transmitting the authentication order data from the host computer to the authentication apparatus allows the authentication order to be easily registered.

The rights to register the authentication order are given to, for example, persons, posts, and departments. Appropriately changing the authentication order for every person, post, and department allows unauthorized use of the authentication apparatus to be effectively prevented.

With authentication apparatus 1 as configured according to embodiments such as represented by FIG. 7, only transmitting the authentication procedure output instruction from host computer 2 to authentication apparatus 1 when it is necessary to disclose the authentication order in authentication apparatus 1 to a third person allows the authentication procedure including the authentication order to be easily output.

Although an authentication method using the login name and the login ID is described hereinabove in connection with embodiments illustrated by FIGS. 7, 8, 9A, 9B, and 10-12, these and other embodiments are not limited to the specifically described method. For example, other pieces of authentication information to identify an individual (for example, a second login name, a second user ID, a phone number, a social security number, a passport number, an account number, a license plate number, an insurance policy number, a mail address, etc.) may be added to the authentication information. Additionally, other pieces of authentication information which assist in identifying an individual (for example, a zip code, a home town, a nearest station, user's birth date, a pet's name, etc.) may be used in combination with the above authentication information. In these cases, since the variation in the authentication order is further increased, it is possible to further improve the security level.

An authentication apparatus according to alternative and/or additional embodiments of the present invention will now be described with reference to FIGS. 13 to 18.

Figure 13:
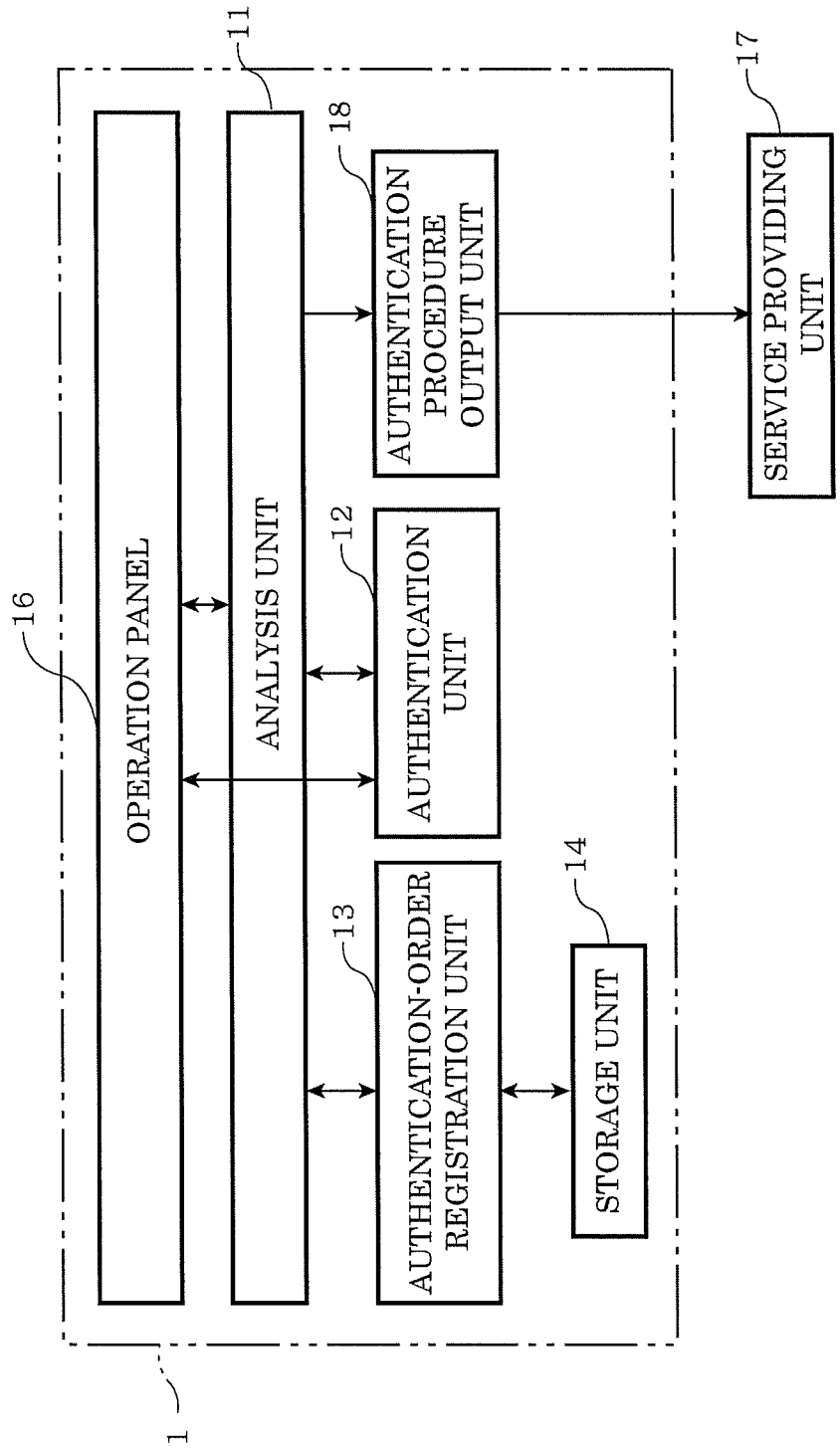
FIG. 13 shows a block diagram that illustrates an example of the configuration of an authentication apparatus according to some embodiments of the present invention.

FIG. 13 shows a block diagram that illustrates an example of the configuration of the authentication apparatus according to such alternative and/or additional embodiments.

More specifically, referring to FIG. 13, authentication apparatus 1 according to some embodiments may include analysis unit 11, authentication unit 12, authentication-order registration unit 13, and authentication procedure output unit 18 as functional blocks realized by the execution of the authentication program code and may include storage unit 14, operation panel (operation unit) 16, and service providing unit 17 as blocks realized by hardware, as in the embodiments described in connection with the authentication apparatus configuration illustrated in FIG. 7.

The function and configuration of each block in the authentication apparatus illustrated in FIG. 13 is approximately the same as in the authentication apparatus illustrated in FIG. 7. However, authentication-order registration unit 13 and authentication procedure output unit 18 differ from the ones in the embodiments described hereinabove in connection with FIG. 7 in, for example, the following points.

Specifically, authentication-order registration unit 13 implemented according to embodiments of the authentication apparatus depicted in FIG. 13 is configured to register the authentication order according to information input with operation panel 16, instead of registering the authentication order according to the authentication order data received from host computer 2.

Authentication procedure output unit 18 implemented according to embodiments of the authentication apparatus depicted in FIG. 13 is configured to output the authentication procedure according to information input with operation panel 16, instead of outputting the authentication procedure in response to the authentication procedure output instruction received from host computer 2.

Illustrative differences from embodiments implemented in accordance with FIGS. 7, 8, 9A, 9B, and 10-12 will now be described with reference to the authentication-order registration processing.

Figure 14:
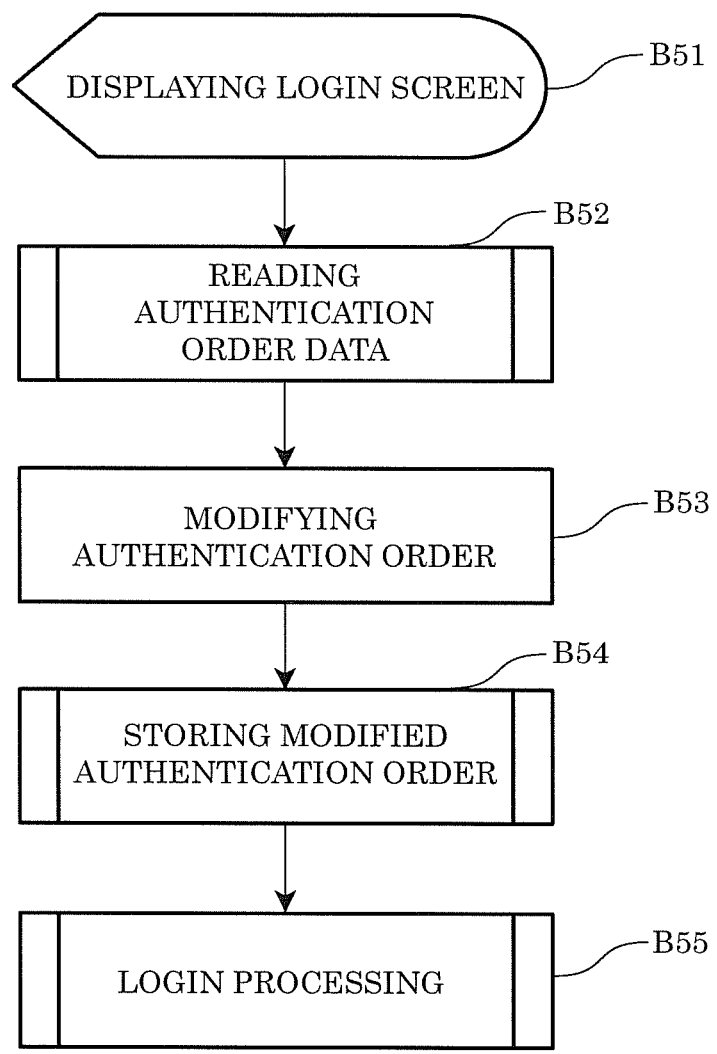
FIG. 14 shows a flowchart that illustrates an example of an authentication-order registration processing in the authentication apparatus of FIG. 13 according to some embodiments of the present invention.

FIG. 14 shows a flowchart that illustrates an example of the authentication-order registration processing in embodiments implemented according to the authentication apparatus illustrated in FIG. 13.

Referring to FIG. 14, when the authentication order is newly registered in the authentication apparatus or the authentication order that is registered in advance is changed (overwritten), in Block B51 an authentication procedure setting screen (refer to FIGS. 15 to 18) is displayed on the operation panel. In Block B52, the analysis unit reads definition data on the authentication order registered in advance from the storage unit.

The analysis unit determines the input operation by the user on the authentication procedure setting screen. In Block B53, the authentication order is modified. In Block B54, the authentication-order registration unit stores the modified authentication order in the storage unit. In Block B55, the login processing is executed.

Screen transitions concerning the modification of the authentication order will now be described.

Figure 15:
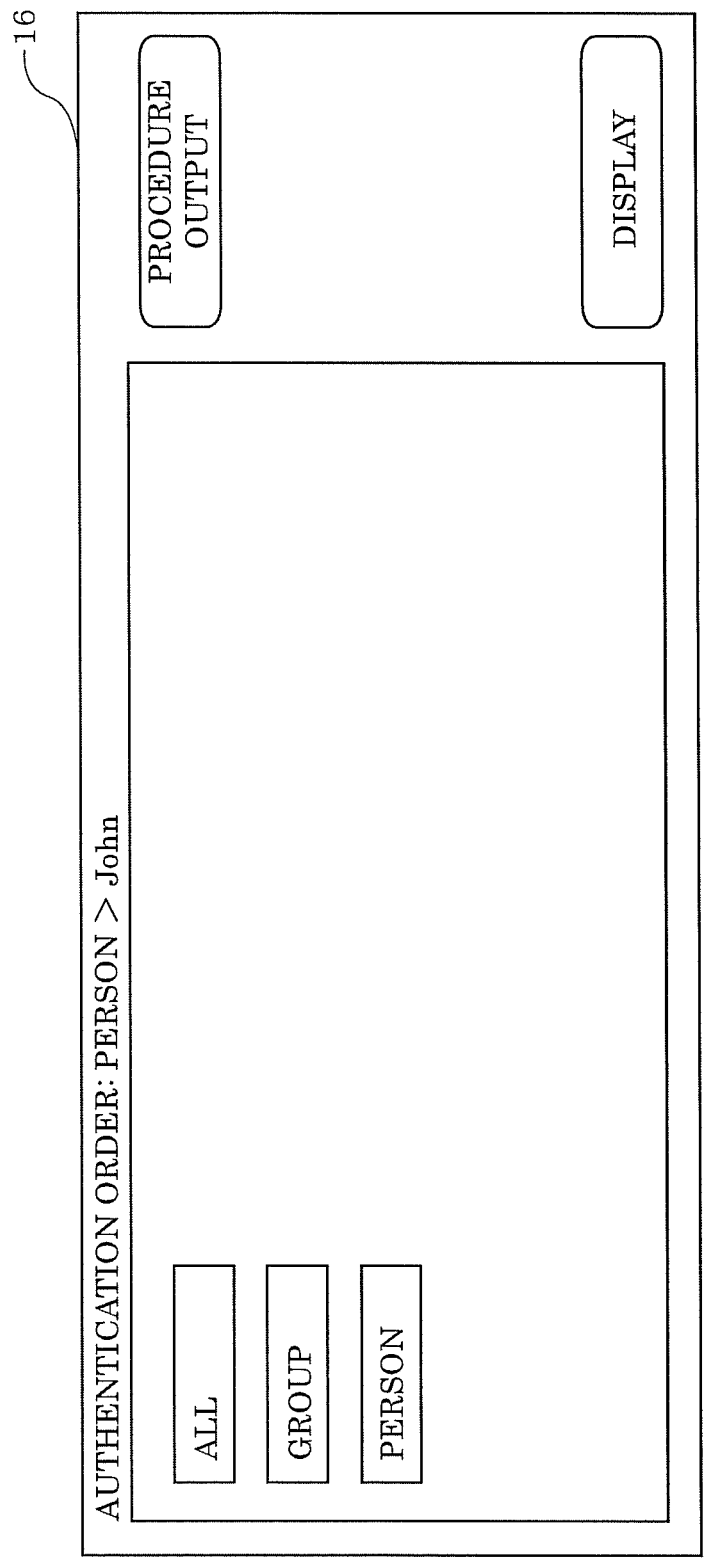
FIG. 15 shows an example of an authentication procedure setting screen (category selection screen) in the authentication apparatus of FIG. 13 according to some embodiments of the present invention.
Figure 16:
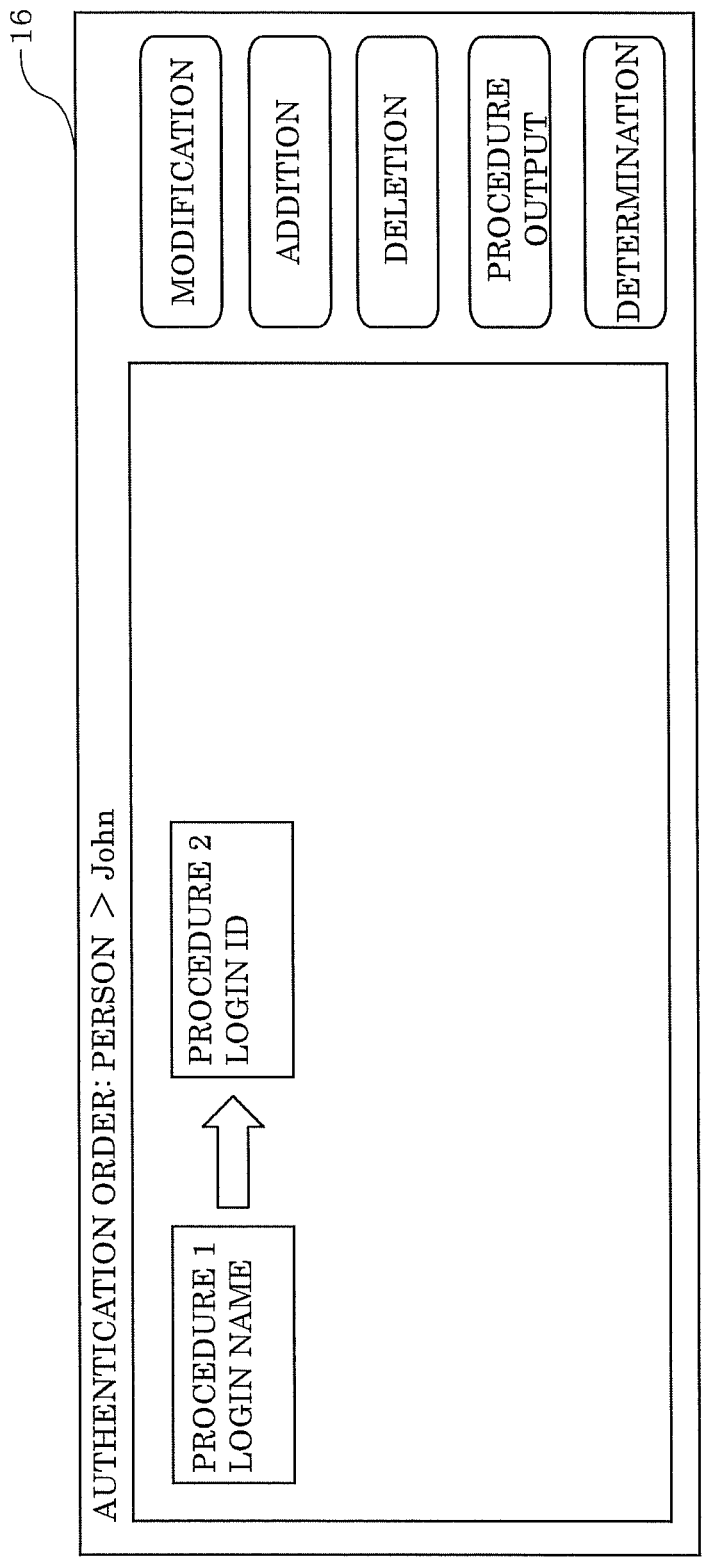
FIG. 16 shows an example of the authentication procedure setting screen (basic screen) in the authentication apparatus of FIG. 13 according to some embodiments of the present invention.
Figure 17:
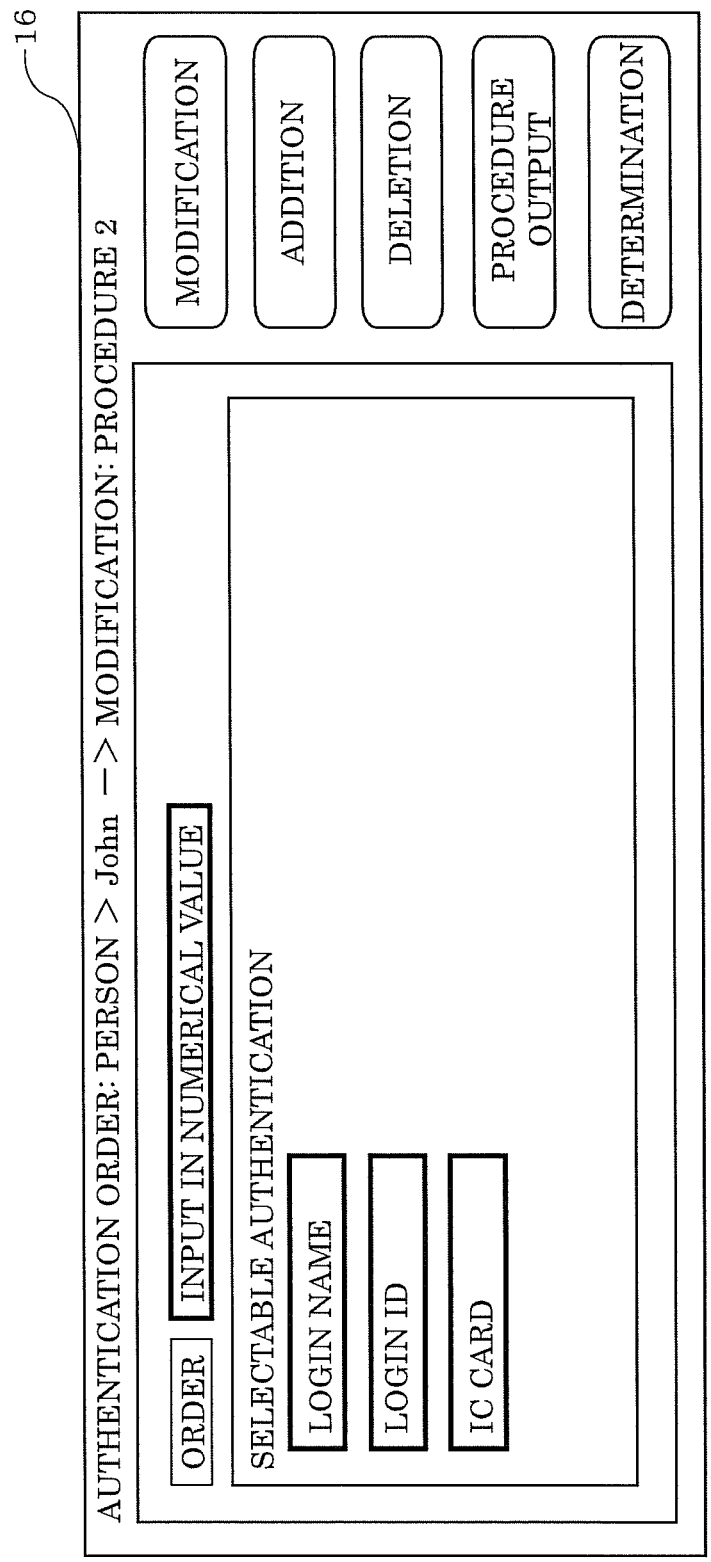
FIG. 17 shows an example of the authentication procedure setting screen (modification screen) in the authentication apparatus of FIG. 13 according to some embodiments of the present invention.
Figure 18:
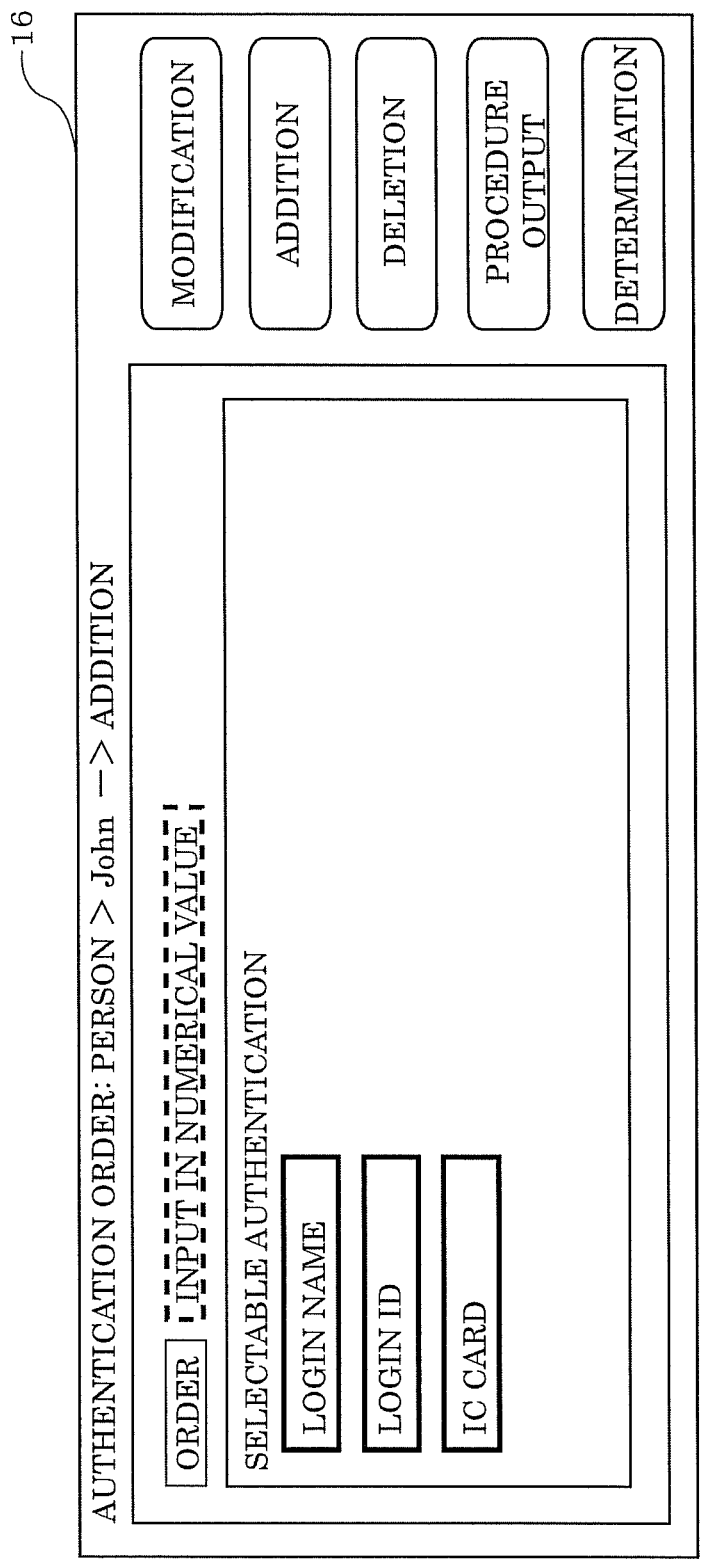
FIG. 18 shows an example of the authentication procedure setting screen (addition screen) in the authentication apparatus of FIG. 13 according to some embodiments of the present invention.

More specifically, in connection with some embodiments of the authentication apparatus implemented according to the configuration illustrated in FIG. 13, FIG. 15 shows an example of the authentication procedure setting screen (category selection screen), FIG. 16 shows an example of the authentication procedure setting screen (basic screen), FIG. 17 shows an example of the authentication procedure setting screen (modification screen), and FIG. 18 shows an example of the authentication procedure setting screen (addition screen).

As shown in FIGS. 15 to 18, the authentication procedure setting screen may comprise, for example, the category selection screen, the basic screen, the modification screen, and the addition screen.

In some embodiments, the authentication apparatus first displays the category selection screen in an authentication procedure setting mode (refer to FIG. 15). Categories including "All", "Group", and "Person" are displayed on the category selection screen where any of the categories may be selected.

For example, if the category "Person" is selected, the category selection screen is moved to a screen (not shown) used to identify a person, where a person is identified. For example, login names that are registered may be displayed in a list, and the corresponding login name may be selected from the list.

After the login name is identified, the basic screen (refer to FIG. 16) is displayed. The authentication order registered in association with the login name is displayed on the basic screen. In addition, processing selection buttons including "Modification", "Addition", "Deletion", and "Procedure output", as well as "Determination" button that is pressed to execute the selected processing, are displayed on the basic screen.

If the authentication order has not been registered for the identified login name, the authentication order is not displayed and a message indicating that the setting made in the apparatus is adopted is displayed.

If the "Modification" button is selected and the "Determination" button is pressed on the basic screen, the basic screen is moved to the modification screen (refer to FIG. 17). If the "Addition" button is selected and the "Determination" button is pressed on the basic screen, the basic screen is moved to the addition screen (refer to FIG. 18). If the "Deletion" button is selected and the "Determination" button is pressed on the basic screen, the basic screen is moved to a deletion screen (not shown).

Since the deletion screen may be used only to select a kind of the authentication information to be deleted, the deletion screen is not displayed herein for clarity of exposition.

If the "Procedure output" button is selected and the "Determination" button is pressed on the basic screen, the authentication procedure output instruction is supplied to the authentication procedure output unit 18 that prints out the authentication procedure.

The kinds of authentication information that can be selected and a numerical-value input part used to specify the input order of the selected authentication information by using a numerical value are displayed on the modification screen shown in FIG. 17. Specifically, a kind of authentication information whose input order is to be modified is selected, the input order is specified by using a numerical value, and the "Determination" button is pressed in order to modify the input order, that is, the authentication order of the authentication information.

If the numerical value specified on the modification screen is duplicated with the input order of another authentication information, priority is given to the input order specified on the modification screen and the duplicated input order of the authentication information is postponed. For example, selecting the "login ID" and specifying a numerical value "1" if the authentication order "login name-login ID" is registered cause the "login ID" to have the first place of the input order and cause the "login name" to have the second place of the input order.

The kinds of authentication information that can be selected and a numerical-value input part used to specify the input order of the selected authentication information by using a numerical value are displayed on the addition screen shown in FIG. 18. Specifically, a kind of authentication information to be added is selected, the input order is specified by using a numerical value, and the "Determination" button is pressed in order to increase the number of the kinds of authentication information required for the login and to set the input order of the authentication information.

If the numerical value specified on the addition screen is duplicated with the input order of another authentication information, priority is given to the input order specified on the addition screen and the duplicated input order of the authentication information is postponed, as on the modification screen. If the "Determination" button is pressed without no numerical valued specified, the selected kind of authentication information is added to the end of the authentication order.

According to embodiments described with reference to FIGS. 13-18, it is possible to register the authentication order even in a situation in which the host computer is not connected or in a situation in which the host computer cannot be used.

In addition, according to embodiments described with reference to FIGS. 13-18, it is possible to output the authentication procedure even in the situation in which the host computer is not connected or in the situation in which the host computer cannot be used.

Although various illustrative embodiments of the present invention are described above, the present invention is not limited to the above embodiments. It will be further understood by those skilled in the art that various changes and modifications may be made to the disclosure without departing from the scope thereof.

For example, the authentication apparatus is not limited to an MFP but is widely applicable to other electronic devices having the authentication function.

The authentication apparatus according to the above embodiments can also be realized by functions that are executed in the computer in the authentication apparatus in response to instructions in the authentication program code. The authentication program code supplies instructions to the blocks (the analysis unit, the authentication unit, the authentication-order registration unit, and the authentication procedure output unit) in the authentication apparatus to cause the blocks to execute the above described processing. In other words, the functions in the authentication apparatus according to the above embodiments may be realized by the units or modules that are provided by the authentication program code being executed by the authentication apparatus.

All or part of the authentication program code may be supplied as a computer-readable medium, such as a magnetic disk, an optical disk, or a semiconductor memory, and the authentication program code read out from the computer-readable medium may be installed in the computer to be executed. Alternatively, all or part of the authentication program code may be directly loaded into the computer for execution via a communication line, not via the computer-readable medium.

In part, in some embodiments, the disclosure may be summarized as follows.

An authentication apparatus according to some embodiments of the present disclosure may include a storage unit, an analysis unit, and an authentication unit. The storage unit may be configured to store pieces of authentication information and an authentication order of the pieces of authentication information. The analysis unit may be configured to compare pieces of input information with the pieces of authentication information and to compare an input order of the pieces of input information with the authentication order. The authentication unit may be configured to authorize the pieces of input information if the comparison shows that the pieces of input information match the pieces of authentication information as necessary to authenticate and the input order of the pieces of input information matches the authentication order.

As described above, it is possible to effectively prevent unauthorized use of the apparatus due to leakage of the authentication information, thus reinforcing internal control.

In addition to the above-mentioned configuration, the storage unit may be configured to store authentication commands as the pieces of authentication information and an authentication order of the authentication commands. The analysis unit may be configured to compare description commands as the pieces of input information described in processing data received from a host computer with the authentication commands and to compare a description order as the input order of the description commands in the processing data with the authentication order. The authentication unit may be configured to permit execution of processing of the processing data if the comparison shows that each of the authentication commands matches any of the description commands and the description order of the description commands matched with the authentication commands matches the authentication order.

Consequently, it is possible to effectively prevent unauthorized use of the apparatus due to leakage of the authentication information in the processing of the processing data.

In some implementations, the authentication apparatus further may include an authentication-order registration unit. The authentication-order registration unit may be configured to register the authentication commands and the authentication order of the authentication commands on the basis of authentication order data received from the host computer and to store the authentication commands and the authentication order of the authentication commands in the storage unit.

Consequently, only transmitting the authentication order data from the host computer to the electronic device allows the authentication order to be easily registered.

In addition to the above-mentioned configuration, the authentication commands may be used in the processing of the processing data.

Consequently, it is hard for others to identify the authentication commands and to recognize the fact that the authentication is performed on the basis of the description order of the commands. In other words, since it is hard for others to recognize the authentication commands as the authentication information even if the others know the authentication commands, it is possible to effectively prevent unauthorized use of the apparatus.

In addition to the above-mentioned configuration, the authentication commands may have no effect on the processing result even if the description order is varied.

Consequently, since the authentication method is varied according to the description order of the description commands, the authentication method offers the advantage of being easily varied without changing the authentication commands.

In addition to the above-mentioned configuration, the processing data may be print data. Furthermore, the authentication commands and the description commands may be print control commands.

Consequently, it is possible for the user to set the authentication commands and the authentication order in the printer driver in the host computer and to describe the description commands in the generation of the print data.

The authentication apparatus further may include a service providing unit and an operation unit. The service providing unit may be configured to provide a specific service to a user. The operation unit may be configured to accept an input operation by the user to supply the pieces of input information corresponding to the input operation. In addition to the above-mentioned configuration, the analysis unit may be configured to compare the pieces of input information supplied from the operation unit with the pieces of authentication information and to compare an input order of the pieces of input information with the authentication order. The authentication unit may be configured to permit use of the service providing unit if the comparison shows that each of the pieces of input information matches any of the pieces of authentication information and the input order of the pieces of input information matches the authentication order.

Consequently, it is possible to vary the authentication method without changing the authentication information, such as the password.

The authentication apparatus further may include an authentication-order registration unit. The authentication-order registration unit may be configured to register the authentication order on the basis of authentication order data that is input and to store the authentication order in the storage unit.

In addition to the above-mentioned configuration, the authentication-order registration unit may register the authentication order on the basis of the authentication order data input through a specific operation unit. Otherwise the authentication-order registration unit may register the authentication order on the basis of the authentication order data that is externally supplied.

Consequently, only supplying the authentication order data to the electronic device allows the authentication order to be easily registered.

The authentication apparatus further may include an authentication procedure output unit. The authentication procedure output unit may be configured to output an authentication procedure including the authentication order in response to an output instruction that is input.

In addition to the above-mentioned configuration, the authentication procedure output unit may output the authentication procedure in response to the output instruction input through the operation unit. Otherwise the authentication procedure output unit may output the authentication procedure in response to the output instruction that is externally supplied.

Consequently, only supplying the authentication procedure output instruction to the electronic device when it is necessary to disclose the authentication order in the electronic device to a third person allows the authentication procedure including the authentication order to be easily output.

In addition to the above-mentioned configuration, the pieces of authentication information may correspond to distinct parameters. The authentication order of the pieces of authentication information may be (i) settable to any one of a plurality of different orders and (ii) not disclosed to others not authorized to access the corresponding pieces of authentication information. The distinct parameters comprise, for example, distinct print commands. Or, the distinct parameters comprise log-in name and log-in identification information.

At least one computer-readable medium according to some embodiments of the present disclosure stores authentication program code for execution by at least one computer in an authentication apparatus. The authentication program code may include two program code segments. The first program code segment may cause the at least one computer to compare pieces of input information with pieces of authentication information stored in a storage unit and to compare an input order of the pieces of input information with an authentication order stored in the storage unit. The second program code segment may cause the at least one computer to authorize the pieces of input information if the comparison shows that the pieces of input information match the pieces of authentication information as necessary to authenticate and the input order of the pieces of input information matches the authentication order.

As described above, it is possible to effectively prevent unauthorized use of the apparatus due to leakage of the authentication information to reinforce the internal control.

In addition to the above-mentioned configuration, program code segment (e.g., a first program code segment) may cause the computer to compare description commands as the pieces of input information described in processing data received from a host computer with authentication commands as the pieces of authentication information and to compare a description order as the input order of the description commands in the processing data with an authentication order stored in the storage unit. The program code segment (e.g., a second program code segment) may cause the computer to permit execution of processing of the processing data if the comparison shows that each of the authentication commands matches any of the description commands and the description order of the description commands matched with the authentication commands matches the authentication order.

Consequently, it is possible to effectively prevent unauthorized use of the apparatus due to leakage of the authentication information in the processing of the processing data.

In addition to the above-mentioned configuration, the program code segment (e.g., first program code segment) may cause the computer to compare the pieces of input information supplied from an operation unit with the pieces of authentication information and to compare the input order of the pieces of input information with the authentication order. The program code (e.g., second program code segment) may cause the computer to permit use of a specific service by the user if the comparison shows that each of the pieces of input information matches any of the pieces of authentication information and the input order of the pieces of input information matches the authentication order.

Consequently, it is possible to vary the authentication method without changing the authentication information, such as the password.

An authentication apparatus may include at least one processor and program code stored on at least one computer readable medium for execution by the at least one processor. The program code when executed by the at least one processor may cause the at least one processor to carry out a method. The method may include (1) comparing pieces of input information with pieces of authentication information stored in a storage unit and comparing an input order of the pieces of input information with an authentication order stored in the storage unit by an analysis unit; and (2) authorizing the pieces of input information if the comparison shows that the pieces of input information match the pieces of authentication information as necessary to authenticate and the input order of the pieces of input information matches the authentication order.

As described above, it is possible to effectively prevent unauthorized use of the apparatus due to leakage of the authentication information to reinforce the internal control.

While the invention has been described and illustrated in considerable detail with reference to certain embodiments herein, other embodiments are possible as will be understood by those skilled in the art in view of the present disclosure. Additionally, as such, the foregoing illustrative embodiments, examples, features, advantages, and attendant advantages are not meant to be limiting of the present invention, as the invention may be practiced according to various alternative embodiments, as well as without necessarily providing, for example, one or more of the features, advantages, and attendant advantages that may be provided by the foregoing illustrative embodiments.

Systems and modules described herein, and variations thereof, may be implemented in many different configurations comprising any combination(s) of software, firmware, and/or hardware suitable for the purposes described herein. Except to the extent necessary or inherent in the processes themselves, no particular order to steps or stages of methods or processes described in this disclosure, including the Figures, is implied. In many cases the order of process steps may be varied, and various illustrative steps may be combined, altered, or omitted, without changing the purpose, effect or import of the methods described. For example, non-dependent processes and/or acts may be performed in parallel, such as by multiprocessing (e.g., using a multi-core processor and/or multiple processors).

Accordingly, it should be understood that various changes and modifications to the embodiments described herein will be apparent to those skilled in the art. Such changes and modifications can be made without departing from the scope of the present subject matter and without diminishing its intended advantages. It is therefore intended that such changes and modifications be covered by the appended claims.

Having thus described in detail embodiments of the present invention, it is to be understood that the invention defined by the foregoing paragraphs is not to be limited to particular details and/or embodiments set forth in the above description, as many apparent variations thereof are possible without departing from the scope of the present invention.

What is claimed is:

1. An authentication apparatus comprising:
    a storage unit that stores pieces of authentication information and an authentication order of the pieces of authentication information;
    an operation unit that accepts an input operation by the user to supply pieces of input information corresponding to the input operation;
    an analysis unit that compares the pieces of input information supplied from the operation unit with the pieces of authentication information and compares an input order of the pieces of input information with the authentication order, wherein the pieces of authentication information correspond to distinct parameters comprising distinct print commands, and wherein the authentication order of the pieces of authentication information is (i) settable to any one of a plurality of different orders and (ii) not disclosed to others not authorized to access the corresponding pieces of authentication information;
    an authentication unit that authorizes the pieces of input information if the comparison shows that the pieces of input information match the pieces of authentication information as necessary to authenticate and the input order of the pieces of input information matches the authentication order; and
    an authentication-order registration unit that registers the authentication order on the basis of authentication order data that is input and stores the authentication order in the storage unit, wherein the authentication-order registration unit sets the authentication order for each of a plurality of rights, wherein:
    the authentication order data includes an authentication-information definition part defining kinds of the authentication information and an authentication-order setting part setting kinds of the authentication information and the authentication order of the authentication information;
    the authentication-information definition part includes combinations of identification symbols given to pieces of the authentication information and display names indicating the pieces of the authentication information; and
    the authentication-order setting part in the authentication order data includes combinations of figures indicating the authentication order of the pieces of authentication information and the identification symbols; and
    the operation unit displays both authentication input fields for inputting necessary authentication information and a pseudo-authentication input field that is not necessary for the authentication when the authentication-order setting part does not include each identification symbol out of the identification symbols that are included in the authentication-information definition part.

2. The authentication apparatus according to claim 1, further comprising:
    a service providing unit that provides a specific service to a user; wherein:
    the analysis unit compares the pieces of input information supplied from the operation unit with the pieces of authentication information and compares an input order of the pieces of input information with the authentication order; and
    the authentication unit permits a use of the service providing unit if the comparison shows that each of the pieces of input information matches any of the pieces of authentication information and the input order of the pieces of input information matches the authentication order.

3. The authentication apparatus according to claim 1, wherein the authentication-order registration unit registers the authentication order on the basis of the authentication order data input through a specific operation unit.

4. The authentication apparatus according to claim 1, wherein the authentication-order registration unit registers the authentication order on the basis of the authentication order data that is externally supplied.

5. The authentication apparatus according to claim 1, further comprising:
    an authentication procedure output unit that outputs an authentication procedure including the authentication order in response to an output instruction that is input.

6. The authentication apparatus according to claim 5, wherein the authentication procedure output unit outputs the authentication procedure in response to the output instruction input through the operation unit.

7. The authentication apparatus according to claim 5, wherein the authentication procedure output unit outputs the authentication procedure in response to the output instruction that is externally supplied.

8. An authentication apparatus comprising:
    a storage unit that stores pieces of authentication information and an authentication order of the pieces of authentication information;
    an analysis unit that compares pieces of input information with the pieces of authentication information and compares an input order of the pieces of input information with the authentication order, wherein the pieces of authentication information correspond to distinct parameters comprising distinct print commands, and wherein the authentication order of the pieces of authentication information is (i) settable to any one of a plurality of different orders and (ii) not disclosed to others not authorized to access the corresponding pieces of authentication information; and
    an authentication unit configured to authorize the pieces of input information if the comparison shows that the pieces of input information match the pieces of authentication information as necessary to authenticate and the input order of the pieces of input information matches the authentication order, wherein:
    the storage unit stores authentication commands as the pieces of authentication information and an authentication order of the authentication commands;
    the analysis unit compares description commands as the pieces of input information described in processing data received from a host computer with the authentication commands and to compare a description order as the input order of the description commands in the processing data with the authentication order;
    the authentication unit permits execution of processing of the processing data if the comparison shows that each of the authentication commands matches any of the description commands and the description order of the description commands matched with the authentication commands matches the authentication order;

the authentication commands are used in the processing of the processing data other than the authentication;

the processing data includes print data that describes print control commands;

the authentication commands and the description commands include the print control commands;

the authentication apparatus further comprises an authentication-order registration unit that registers the authentication commands and the authentication order of the authentication commands on the basis of authentication order data received from the host computer and stores the authentication commands and the authentication order of the authentication commands in the storage unit;

the authentication order data defines identification symbols indicating the authentication order of the authentication commands and the names of the available authentication commands, and the names include first names indicating the print control commands and a second name indicating that no authentication command is set; and the authentication unit determines whether the print processing is permitted based on the authentication order corresponding to the first names by ignoring the authentication order corresponding to the second name.

9. The authentication apparatus according to claim 8, wherein the authentication commands have no effect on the processing result even if the description order is varied.

10. The authentication apparatus according to claim 9, wherein:

the authentication command includes at least one print control command selected from the group consisting of a comment command, a print resolution command, an a punching command.

11. At least one computer-readable non-transitory medium that stores authentication program code for execution by at least one computer in an authentication apparatus, the authentication program code comprising:

first program code segment that, when executed by the at least one computer, is operable in causing the at least one computer to accept an input operation to an operation unit by the user to supply pieces of input information corresponding to the input operation;

second program code segment that, when executed by the at least one computer, is operable in causing the at least one computer to compare the pieces of input information supplied from the operation unit by the first program code with pieces of authentication information stored in a storage unit and to compare an input order of the pieces of input information with an authentication order stored in the storage unit, wherein the pieces of authentication information correspond to distinct parameters comprising distinct print commands, and wherein the authentication order of the pieces of authentication information is (i) settable to any one of a plurality of different orders and (ii) not disclosed to others not authorized to access the corresponding pieces of authentication information; and third program code segment that, when executed by the at least one computer, is operable in causing the at least one computer to authorize the pieces of input information if the comparison shows that the pieces of input information match the pieces of authentication information as necessary to authenticate and the input order of the pieces of input information matches the authentication order; and fourth program code segment that, when executed by the at least one computer, is operable in causing the at least one computer to register the authentication order on the basis of authentication order data that is input and to store the authentication order in the storage unit, wherein the fourth program code segment is operable in causing the at least one computer to set the authentication order for each of a plurality of rights, wherein the authentication order data includes an authentication-information definition part defining kinds of the authentication information and an authentication-order setting part setting kinds of the authentication information and the authentication order of the authentication information;

the authentication-information definition part includes combinations of identification symbols given to pieces of the authentication information and display names indicating the pieces of the authentication information; and the authentication-order setting part in the authentication order data includes combinations of figures indicating the authentication order of the pieces of authentication information and the identification symbols; and the first program code segment is operation to cause the at least one computer to display both authentication input fields for inputting necessary authentication information and a pseudo-authentication input field that is not necessary for the authentication when the authentication-order setting part does not include each identification symbol out of the identification symbols that are included in the authentication-information definition part.

12. The at least one computer-readable non-transitory medium according to claim 11, wherein:

the second program code segment is operable to cause the at least one computer to compare the pieces of input information supplied from the operation unit with the pieces of authentication information and to compare the input order of the pieces of input information with the authentication order; and the third program code segment is operable to cause the at least one computer to permit use of a specific service if the comparison shows that each of the pieces of input information matches any of the pieces of authentication information and the input order of the pieces of input information matches the authentication order.

13. At least one computer-readable non-transitory medium that stores authentication program code for execution by at least one computer in an authentication apparatus, the authentication program code comprising:

first program code segment that, when executed by the at least one computer, is operable in causing the at least one computer to compare pieces of input information with pieces of authentication information stored in a storage unit and to compare an input order of the pieces of input information with an authentication order stored in the storage unit, wherein the pieces of authentication information correspond to distinct parameters comprising distinct print commands, and wherein the authentication order of the pieces of authentication information is (i) settable to any one of a plurality of different orders and (ii) not disclosed to others not authorized to access the corresponding pieces of authentication information; and second program code segment that, when executed by the at least one computer, is operable in causing the at least one computer to authorize the pieces of input information if the comparison shows that the pieces of input information match the pieces of authentication information as necessary to authenticate and the input order of the pieces of input information matches the authentication order, wherein:

the first program code segment is operable in causing the at least one computer to compare description commands as the pieces of input information described in processing data received from a host computer with authentication commands as the pieces of authentication information and to compare a description order as the input order of the description commands in the processing data with the authentication order;

the second program code segment is operable in causing the at least one computer to permit execution of processing of the processing data if the comparison shows that each of the authentication commands matches any of the description commands and the description order of the description commands matched with the authentication commands matches the authentication order;

the authentication commands are used in the processing of the processing data other than the authentication;

the processing data includes print data that describes print control commands;

the authentication commands and the description commands include the print control commands;

the authentication order data defines identification symbols indicating the authentication order of the authentication commands and the names of the available authentication commands, and the names include first names indicating the print control commands and a second name indicating that no authentication command is set; and the second program code segment is operable in causing the at least one computer to determine whether the print processing is permitted based on the authentication order corresponding to the first names and without determining the authentication order corresponding to the second name.

14. An authentication apparatus comprising at least one processor and program code stored on at least one computer readable medium for execution by the at least one processor, the program code when executed by the at least one processor causing the at least one processor to carry out a method comprising:

accepting an input operation to an operation unit by the user to supply pieces of input information corresponding to the input operation;

comparing the pieces of input information supplied from the operation unit with pieces of authentication information stored in a storage unit and comparing an input order of the pieces of input information with an authentication order stored in the storage unit, wherein the pieces of authentication information correspond to distinct parameters comprising distinct print commands, and wherein the authentication order of the pieces of authentication information is (i) settable to any one of a plurality of different orders and (ii) not disclosed to others not authorized to access the corresponding pieces of authentication information;

authorizing the pieces of input information if the comparison shows that the pieces of input information match the pieces of authentication information as necessary to authenticate and the input order of the pieces of input information matches the authentication order;

registering the authentication order on the basis of authentication order data that is input; and storing the authentication order in a storage unit, wherein the authentication order is set for each of a plurality of rights, wherein the authentication order data includes an authentication-information definition part defining kinds of the authentication information and an authentication-order setting part setting kinds of the authentication information and the authentication order of the authentication information;

the authentication-information definition part includes combinations of identification symbols given to pieces of the authentication information and display names indicating the pieces of the authentication information; and the authentication-order setting part in the authentication order data includes combinations of figures indicating the authentication order of the pieces of authentication information and the identification symbols; and the operation unit displays both authentication input fields for inputting necessary authentication information and a pseudo-authentication input field that is not necessary for the authentication when the authentication-order setting part does not include each identification symbol out of the identification symbols that are included in the authentication-information definition part.

15. An authentication apparatus comprising at least one processor and program code stored on at least one computer readable medium for execution by the at least one processor, the program code when executed by the at least one processor causing the at least one processor to carry out a method comprising:

storing authentication commands as pieces of authentication information and an authentication order of the authentication commands in a storage unit;

comparing pieces of input information with the pieces of authentication information and comparing an input order of the pieces of input information with an authentication order stored in the storage unit, wherein the pieces of input information include description commands described in processing data received from a host computer and the input order include a description order of the description commands in the processing data, wherein the pieces of authentication information correspond to distinct parameters comprising distinct print commands, and wherein the authentication order of the pieces of authentication information is (i) settable to any one of a plurality of different orders and (ii) not disclosed to others not authorized to access the corresponding pieces of authentication information;

authorizing the pieces of input information if the comparison shows that the pieces of input information match the pieces of authentication information as necessary to authenticate and the input order of the pieces of input information matches the authentication order; and permitting execution of processing of the processing data if the comparison shows that each of the authentication commands matches any of the description commands and the description order of the description commands matched with the authentication commands matches the authentication order; and registering the authentication commands and the authentication order of the authentication commands on the basis of authentication order data received from the host computer and storing the authentication commands and the authentication order of the authentication commands in the storage unit, wherein:

the authentication commands are used in the processing of the processing data other than the authentication;

the processing data includes print data that describes print control commands;

the authentication commands and the description commands include the print control commands;

the authentication order data that defines identification symbols indicating the authentication order of the authentication commands and the names of the available authentication commands, and the names include first names indicating the print control commands and a second name indicating that no authentication command is set; and the method further comprises determining whether the print processing is permitted based on the authentication order corresponding to the first names and without determining the authentication order corresponding to the second name.

* * * * *